United States Patent
Fisher et al.

(10) Patent No.: US 11,854,128 B2
(45) Date of Patent: Dec. 26, 2023

(54) AUTOMATED DIGITAL TOOL IDENTIFICATION FROM A RASTERIZED IMAGE

(71) Applicant: Adobe Inc., San Jose, CA (US)

(72) Inventors: Matthew David Fisher, San Carlos, CA (US); Vineet Batra, Pitam Pura (IN); Mrinalini Sardar, Noida (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 55 days.

(21) Appl. No.: 17/170,401

(22) Filed: Feb. 8, 2021

(65) Prior Publication Data

US 2022/0254076 A1 Aug. 11, 2022

(51) Int. Cl.
| | | |
|---|---|---|
| *G06T 11/40* | (2006.01) | |
| *G06T 7/11* | (2017.01) | |
| *G06F 3/04817* | (2022.01) | |
| *G06F 3/04842* | (2022.01) | |
| *G06T 11/60* | (2006.01) | |
| *G06F 18/40* | (2023.01) | |

(Continued)

(52) U.S. Cl.
CPC .......... *G06T 11/40* (2013.01); *G06F 3/04817* (2013.01); *G06F 3/04842* (2013.01);
(Continued)

(58) Field of Classification Search
CPC . G06T 11/40; G06T 7/11; G06T 11/60; G06T 11/80; G06T 7/00;
(Continued)

(56) References Cited

U.S. PATENT DOCUMENTS

| | | | |
|---|---|---|---|
| 8,514,238 B2 * | 8/2013 | Winnemoeller ...... | G06T 11/001 345/582 |
| 10,796,086 B2 * | 10/2020 | Lewbel ................ | G06F 40/197 |

(Continued)

OTHER PUBLICATIONS

Hu et al., "Inverse Image Editing: Recovering a Semantic Editing History from a Before-and-After Image Pair", ACM Transactions on Graphics, vol. 32, Issue 6, Nov. 2013 Article No. 194, pp. 1-11 (Year: 2013).*

(Continued)

*Primary Examiner* — William A Beutel
(74) *Attorney, Agent, or Firm* — FIG. 1 Patents

(57) ABSTRACT

A visual lens system is described that identifies, automatically and without user intervention, digital tool parameters for achieving a visual appearance of an image region in raster image data. To do so, the visual lens system processes raster image data using a tool region detection network trained to output a mask indicating whether the digital tool is useable to achieve a visual appearance of each pixel in the raster image data. The mask is then processed by a tool parameter estimation network trained to generate a probability distribution indicating an estimation of discrete parameter configurations applicable to the digital tool to achieve the visual appearance. The visual lens system generates an image tool description for the parameter configuration and incorporates the image tool description into an interactive image for the raster image data. The image tool description enables transfer of the digital tool parameter configuration to different image data.

20 Claims, 13 Drawing Sheets
(6 of 13 Drawing Sheet(s) Filed in Color)

(51) Int. Cl.
  *G06F 18/214* (2023.01)
  *G06F 18/2411* (2023.01)
(52) U.S. Cl.
  CPC ...... *G06F 18/2155* (2023.01); *G06F 18/2411* (2023.01); *G06F 18/40* (2023.01); *G06T 7/11* (2017.01); *G06T 11/60* (2013.01)
(58) Field of Classification Search
  CPC . G06T 2207/20081; G06T 2207/20084; G06F 3/04817; G06F 3/04842; G06K 9/6253; G06K 9/6259; G06K 9/6269; G06K 9/00; G06V 10/25; G06V 10/82; G06V 30/40
  See application file for complete search history.

(56) References Cited

U.S. PATENT DOCUMENTS 10,810,725 B1 * 10/2020 Dolhansky ........... G06V 10/764
11,093,130 B1    8/2021 Sinha et al.
2016/0140701 A1 * 5/2016 Angara ................ G06V 10/143
                                                  345/618
2017/0132768 A1 * 5/2017 Bedi ....................... G06T 11/60

OTHER PUBLICATIONS 2117589.8 , "Combined Search and Examination Report", GB Application No. 2117589.8, dated May 18, 2022, 66 pages.
Long, Jonathan et al., "Fully Convolutional Networks for Semantic Segmentation", arXiv Preprint [retrieved Dec. 10, 2020]. Retrieved from the Internet <https://arxiv.org/pdf/1411.4038.pdf>., Nov. 14, 2014, 10 pages.
Yu, Fisher et al., "Dilated Residual Networks", arXiv Preprint [retrieved Dec. 10, 2020]. Retrieved from the Internet <https://arxiv.org/pdf/1705.09914v1.pdf>., May 28, 2017, 9 pages.
GB2117589.8 , "Examination Report", GB Application No. GB2117589.8, dated Jul. 31, 2023, 5 pages.

* cited by examiner

AUTOMATED DIGITAL TOOL IDENTIFICATION FROM A RASTERIZED IMAGE

BACKGROUND

Digital artists often browse collections of digital artwork created by other artists to gain inspiration for their own creations and to learn new skills. While numerous sources for such digital artwork collections are available for browsing, these collections reveal only the final product artwork and do not include information indicating how the artwork was created or what steps were taken to achieve the final product, thus frustrating artists' ability to learn how to incorporate similar techniques in creating their own artwork. The proliferation of available tools for creating digital artwork further compounds this difficulty in understanding how final artwork is achieved, as different tools are useable to achieve similar effects.

As such, interpretations of how final product artwork was achieved is subject to potential human bias and are often ambiguous to the point where different digital artists perceive different tools used to create the same artwork. Accordingly, because conventional systems lack the ability to analyze digital artwork and connect parts of the artwork back to the tools that were used to create it, artists are forced to experiment with different tools in an effort to replicate desired results, which results in inefficient consumption of computational resources by requiring repeated iterations.

SUMMARY

A visual lens system is described that identifies, automatically and without user intervention, digital tool parameters that are useable to achieve a visual appearance of an image region in raster image data. To do so, the visual lens system processes raster image data using a tool region detection network trained to output, for each of a plurality of different digital tools, a mask indicating whether the respective digital tool is useable to achieve a visual appearance of each pixel in the raster image data. Masks indicating a useable digital tool are then processed by a tool parameter estimation network trained to generate a probability distribution indicating an estimation of discrete parameter configurations applicable to the digital tool to achieve the visual appearance.

The visual lens system generates an image tool description that indicates the digital tool parameter configuration useable to achieve the visual appearance of the image region and incorporates the image tool description into an interactive image for the raster image data. The interactive image, responsive to selection of the image region, causes display of the image tool description, thereby indicating how similar visual appearances are achievable in other image data. The visual lens system is further configured to provide information pertaining to the digital tool as well as enable application of the digital tool and its parameter configuration as identified in the interactive image to vector image data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In some implementations, entities represented in the figures are indicative of one or more entities and thus reference is made interchangeably to single or plural forms of the entities in the discussion.

DETAILED DESCRIPTION

Overview

Figure 1:
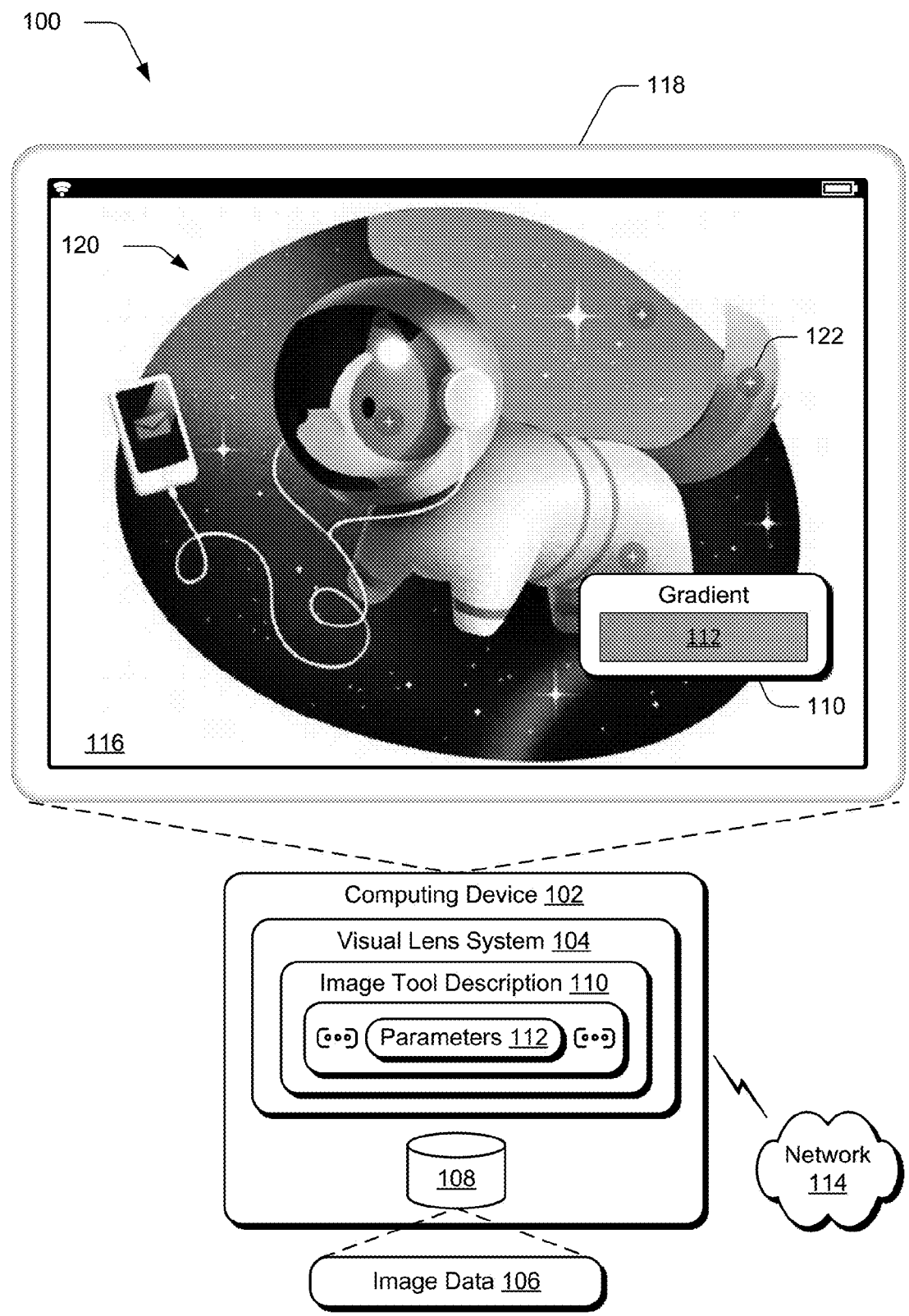
FIG. 1 is an illustration of an environment in an example implementation that is operable to employ automated digital tool identification from a rasterized image as described herein.

Computing devices that implement graphics creation and editing software offer an increasing range of digital tools that are useable to define a visual appearance of portions of graphics image data. Digital graphic designers tasked with creating digital image data often browse large collections of digital artwork from various locations to glean inspiration for their own projects and to improve their own image creation and processing skills. However, digital artwork is often presented in rasterized form with only information describing individual pixel colors and does not provide an indication as to specific digital tools that were used in creating the digital artwork.

Given the increasing range of digital tools used to generate this visual data, even the most experienced digital artist is often unaware as to how to achieve the same visual result and incorporate such inspiration into their own image data. Accordingly, digital graphic designers and artists are tasked with manually experimenting with various digital tools, which results in inefficient use of computational resources from repeated processing in attempts to achieve a visual result.

To address these issues, computing device automated digital tool identification techniques from rasterized image data are described. In one example, a visual lens system generates an interactive image from raster image data that identifies discrete image regions in raster image data and provides an indication of a specific digital tool, and parameter configurations for the specific digital tool, that are useable to achieve a visual appearance of the respective image region. In implementations, the visual lens system generates the interactive image to include descriptive information for the digital tool and to apply the identified parameter configurations of the digital tool automatically to different image data.

The visual lens system 104 is configured to generate the interactive image from raster image data automatically and independent of user intervention. To do so, the visual lens system implements a tool region detection network that is trained to process rasterized image data as input and output a binary mask, for each of a plurality of different image processing digital tools, indicating whether the respective digital tool is useable to achieve a visual appearance of a corresponding pixel in the rasterized image data.

Tool masks indicating that a digital tool is useable to achieve a visual appearance of an image region in the rasterized image data are then used to extract a corresponding image region from the rasterized image data, which is concatenated with the mask and provided as input to a tool parameter estimation network. The tool parameter estimation network is trained to generate a probability distribution that indicates a confidence level of each of a set of discrete possible parameter configurations for a controllable parameter of the digital tool being used to achieve the visual appearance of the image region.

The visual lens system generates an image tool description based on the outputs of the tool region detection network and the tool parameter estimation network, which provides descriptive information regarding the digital tool and its specific parameter configuration(s), as well as controls that enable storing the tool parameters for subsequent use or direct application of the digital tool parameter configuration to different image data. Functionality of the visual lens system is further described in the context of training the tool region detection network and the tool parameter estimation network to enable automatic generation of the interactive image including an image tool description from raster image data. Further discussion of these and other examples is included in the following sections and shown in corresponding figures.

Term Examples

As used herein, the term "image data" refers to digital content that is configured for display by a computing device. Image data includes raster, or rasterized, images as well as vector images.

As used herein, "raster/rasterized image" refers to an image composed of a finite set of digital values (e.g., pixels) that each include finite, discrete quantities of numeric representations that describe a visual appearance of the digital value (e.g., a color, an intensity, a gray value, etc. of a pixel). A raster image is alternatively referred to as a bitmap image, which includes a dot matrix structure that describes a grid of pixels, with each pixel in the grid being specified by a number of bits, and a size of the rasterized image being defined by a width and height of the pixel grid.

In contrast to a raster image, "vector image," as used herein, refers to an image composed of paths and curves (e.g., points connected by polylines, Bezier curves, etc.) dictated by mathematical formulas. Because the visual appearance of a vector image is defined by mathematical formulas, vector images are scalable to adapt to different display resolutions and are not restricted to the finite set of digital values that represent the smallest individual element in a raster image.

As used herein, the term "digital tool" refers to a computer-implemented mechanism for altering a visual appearance of image data, such as functionality supported by vector graphics editors, raster graphics editors, and other digital graphics editing software. Examples of digital tools include gradients (e.g., linear, radial, freeform, etc.), drop shadow, glow (inner and outer), noise, blur, grain, halftone, brush, and so forth. Digital tools are configured for application to discrete portions of image data as well as application to an entirety of the image data.

As used herein, the term "tool parameter" refers to a configurable setting of a digital tool that defines a resulting visual effect of the digital tool on image data to which the digital tool is applied. Each digital tool is thus controlled by one or more tool parameters. For instance, an example linear gradient tool includes three tool parameters: a first color, a second color, and a direction, which collectively specify a color gradient and a direction in which the color gradient progresses from the first color to the second color in a region of image data to which the linear gradient tool is applied.

As used herein, the term "parameter configuration" refers to a specific value or set of values, of a finite range of values or value sets, for a corresponding tool parameter. For instance, control of the first and second color values of the example linear gradient tool parameters described above range in discrete integer values from zero to 256, such that a corresponding parameter configuration for the first and second colors refer to a corresponding one of the discrete integer values. Continuing this example, control of the direction tool parameter for the linear gradient tool ranges degrees from 0 to 360, such that a corresponding parameter configuration for the direction tool refers to a degree value.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automated digital tool identification techniques described herein. The illustrated environment 100 includes a computing device 102, which is configurable in a variety of manners.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is also representative of a plurality of different devices, such as multiple servers utilized by a business to perform operations "over the cloud."

The computing device 102 includes a visual lens system 104. The visual lens system 104 is implemented at least partially in hardware of the computing device 102 to process image data 106, which is illustrated as maintained in a storage device 108 of the computing device 102 in order to generate an image tool description 110 that describes at least one digital tool used to generate a visual appearance of the image data 106 and at least one parameter 112 for each digital tool detected in the image data that describes with specificity how the digital tool was used to achieve the visual appearance. Although illustrated as implemented locally at the computing device 102, functionality of the visual lens system 104 is implementable in whole or in part via functionality available via the network 114, such as part of a web service or "in the cloud," as described in further detail below with respect to FIG. 12.

The image data 106 is representative of raster image data, such as a rasterized graphic or bitmap image. In one example, the image data includes a dot matrix structure that describes a grid of pixels, with each pixel in the grid being specified by a number of bits, and a size of the rasterized image being defined by a width and height of the pixel grid. In this manner, a number of bits used for each pixel in the image data 106 specifies a color depth for the corresponding raster image, where additional bits per pixel enable the image data 106 to express a broader range of colors relative to image data including fewer bits per pixel.

The computing device 102 is configured to render the image data 106 in a user interface 116 of the visual lens system 104 at a display device 118 communicatively coupled to the computing device 102. By processing the image data 106 using the techniques described herein, the image data 106 is rendered as an interactive image 120, which includes at least one selectable user interface component 122 that indicates a region in the image data 106 at which a digital tool was used to achieve a certain visual appearance. The selectable user interface component 122 is configured to cause display of the image tool description 110 generated by the visual lens system 104 for the region indicated by the selectable user interface component 122.

The image tool description 110 includes at least an identification of the digital tool useable to achieve the visual appearance of the corresponding region and at least one parameter 112 for the identified digital tool, thereby enabling a user of the visual lens system 104 to recreate the visual appearance in different image data. For instance, in the digital medium environment 100, the image tool description 110 corresponding to the region indicated by the selectable user interface component 122 in the interactive image 120 describes that a "Gradient" digital tool with an orange color parameter is useable to achieve the visual appearance of the image region.

Although parameter 112 is depicted in the illustrated example as a visual rendering of a specific color used in conjunction with the "Gradient" digital tool identified by the image tool description 110, parameters 112 of the image tool description 110 are presented in the interactive image 120 in a variety of manners. Examples of presenting parameters 112 include textual descriptions (e.g., a name of the depicted color used with the digital tool, such as "tangerine orange"), numerical parameter values (e.g., a hexadecimal code, a decimal code, and so forth indicating the depicted color used with the digital tool), combinations thereof, and so forth. In some implementations, the image tool description 110 includes additional information describing the digital tool, such as a uniform resource locator (URL) that points to relevant information regarding the digital tool, such as instructional information for using the digital tool.

The image tool description 110 enables a user to apply the parameters 112 of the image tool description 110 to one or more different images in the user interface 116 of the visual lens system 104. For instance, the image tool description 110 is configured to be selectable via a drag-and-drop operation and transferred to a region of different image data, which causes the visual lens system 104 to apply the parameters 112 of the digital tool corresponding to the image tool description 110 to the region of the different image data. This transfer is fully parameterized, in that the application of the parameters 112 is performed by modifying specific parameters of one or more digital tools available to the visual lens system 104, thereby enabling users of the visual lens system to further tweak the parameters 112 to achieve a desired resulting appearance of the different image data. Further discussion of this and other examples is included in the following sections and shown using corresponding figures.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Automated Digital Tool Identification from a Rasterized Image

Figure 2:
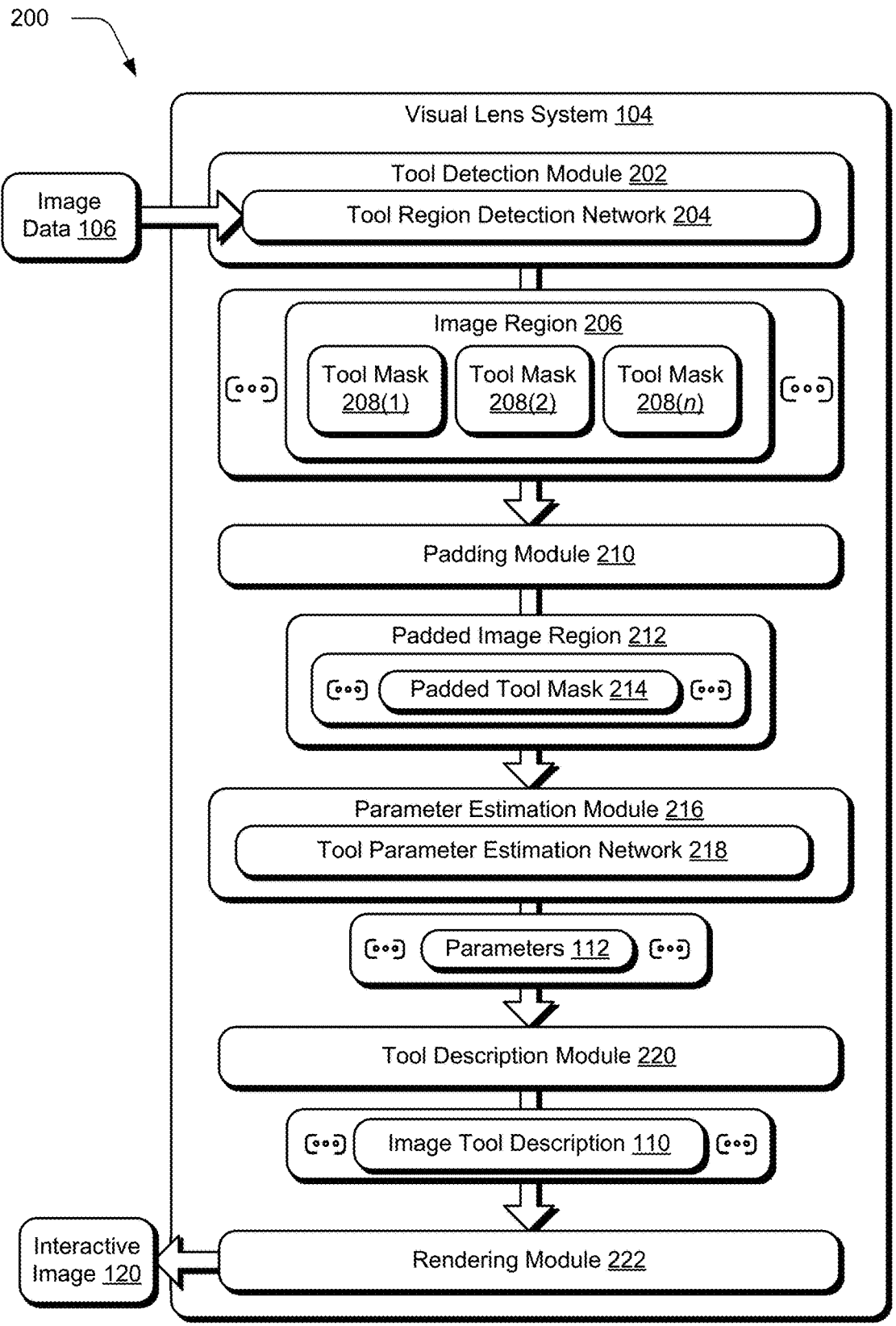
FIG. 2 depicts a system in an example implementation showing operation of the visual lens system of FIG. 1 in greater detail.

FIG. 2 depicts a system 200 in an example implementation showing operation of the visual lens system 104 of FIG. 1 in greater detail. To begin in this example, a tool detection module 202 is employed by the visual lens system 104, which implements a tool region detection network 204. The tool region detection network 204 is representative of functionality of the visual lens system 104 to identify one or more image regions 206 in the image data 106 that were created using one or more digital tools. The tool detection module 202 is configured to first process the image data 106 to conform to an input format upon which the tool region detection network 204 was trained, as described in further detail below.

In an example implementation, the tool detection module 202 processes the image data 106 to a multi-channel (e.g., a 3-channel) image tensor with arbitrary width W and height H. For each image region 206 in the image data 106 detected by the tool region detection network 204 as being generated using one or more digital tools, the tool detection module 202 outputs a plurality of tool masks 208. In the illustrated example, the plurality of tool masks 208 generated for each image region 206 identified in the image data 106 as being generated using one or more digital tools are represented as tool mask 208(1), tool mask 208(2), and tool mask 208(n), where n represents any suitable integer. As described in further detail below with respect to training the tool region detection network 204, n is representative of an integer number of different digital tools upon which the tool region detection network 204 was trained, such that each tool mask 208 output by the tool region detection network 204 corresponds to a different digital tool.

The tool mask 208 represents a probability mask for the image region 206 indicating whether a corresponding digital tool was used to achieve a visual appearance in of the image region 206. For instance, in a binary probability mask implementation, pixels of the tool mask 208 are assigned a value of zero to indicate that a corresponding digital tool was not used and a value of one to indicate that the corresponding digital tool was used to achieve the pixel's visual appearance. In an example implementation, tool mask 208 (1) represents a probability mask indicating whether a "Brush" tool was used to achieve a visual appearance of the image region 206, tool mask 208(2) represents a probability mask indicating whether a "Glow" tool was used to achieve the visual appearance of the image region 206, and tool mask 208(n) represents a probability mask indicating whether a "Gradient" tool was used to achieve the visual appearance of the image region 206. In some implementations, the image region 206 represents an entirety of the image data 106, such that each tool mask 208 comprises a probability mask indicating whether a digital tool was used for each pixel of the image data 106. Alternatively, in some implementations the image region 206 represents a subset of the image data 106 that comprises less than the width W and height H of the tensor representing the image data 106.

Figure 3:
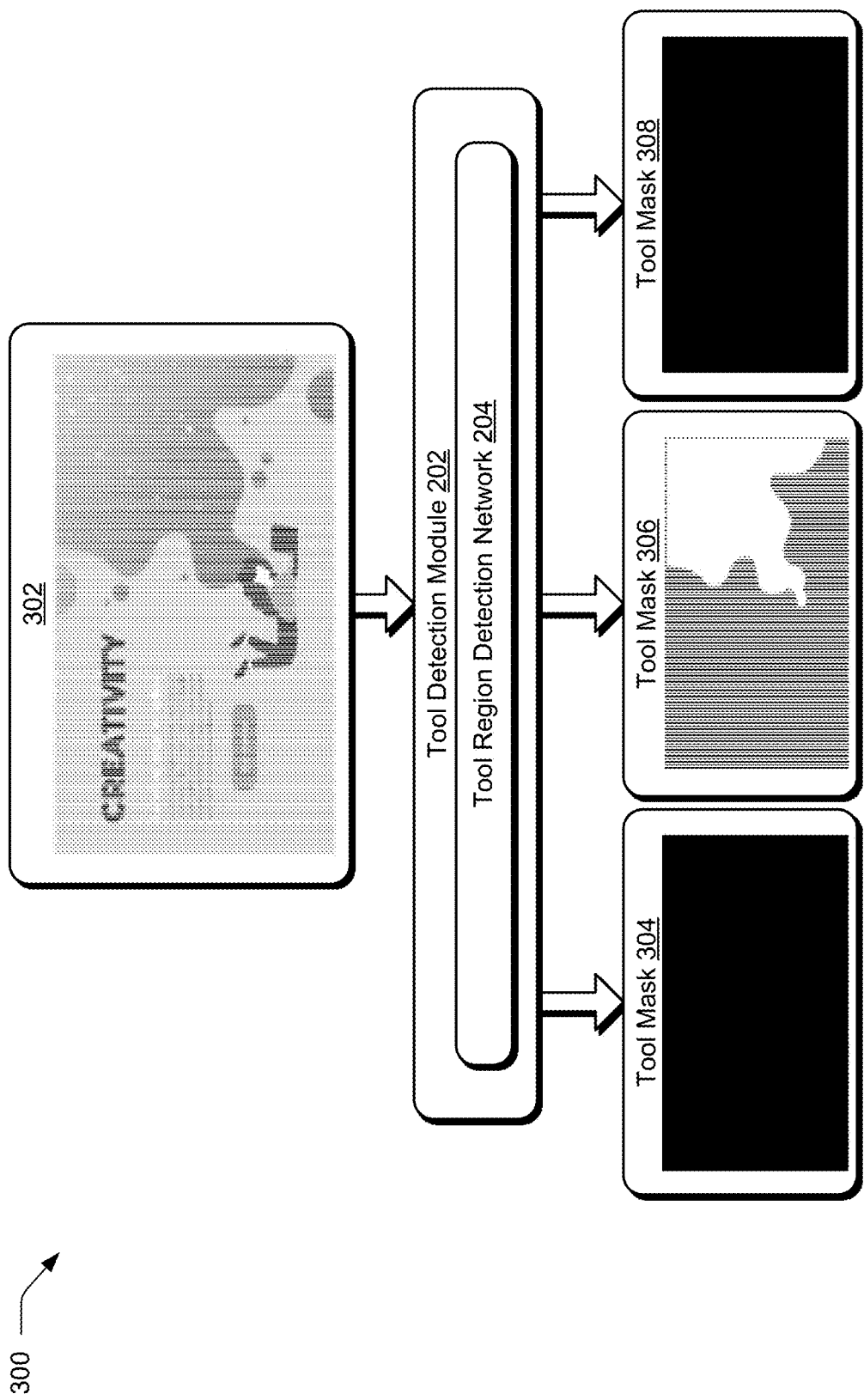
FIG. 3 depicts an example implementation showing operation of a tool region detection network implemented by the visual lens system of FIG. 1 in greater detail.

As shown in the example implementation 300 of FIG. 3, image data 302, which represents an example instance of image data 106, is processed by the tool region detection network 204 to generate a plurality of tool masks 208, represented by tool masks 304, 306, and 308. In the example implementation 300, the image region 206 of image data 302 for each of the tool masks 304, 306, and 308 encompasses an entirety of the image data 302. Tool masks 304 and 308 are illustrated as corresponding to respective digital tools that are not detected as being used in the image data 302 by the tool region detection network 204. Tool mask 306 indicates that the tool region detection network 204 detects use of a digital tool in the image data 302 corresponding to the region of the tool mask 306 represented in white. For example, tool mask 306 corresponds to a "Noise" digital tool and is representative of the tool region detection network 204 detecting that the Noise digital tool was used to generate the appearance of the shape emanating from the head of the person depicted in image data 302 and extending towards an upper right corner of the image data 302. Thus, the tool detection module 202 is configured to generate a tool mask 208 for each digital tool upon which the tool region detection network 204 was trained, thereby indicating whether a digital tool is detected in the image data 106 for a plurality of different digital tools.

In accordance with one or more implementations, each tool mask 208 is a reduced resolution representation of the image region 206, such as a W/8 and H/8 resolution probability mask indicating digital tool usage in the image region 206. By generating each tool mask 208 at a reduced resolution relative to the image region 206, the tool detection module 202 reduces an amount of computational resources otherwise required to generate a tool mask 208 at a same resolution as the image region 206, without compromising accuracy of the image tool description 110 included in the interactive image 120 for the image data 106. The reduced resolution of each tool mask 208 relative to the image data 106 and image region 206 does not negatively impact accuracy of the visual lens system 104 as overall detection of a digital tool's usage in the image data 106 is more important than precise localization of the digital tool's usage in the image data 106. Localization of the digital tool's usage is resolved by the visual lens system 104 as described in further detail below.

The tool detection module 202 communicates each image region 206 generated from the image data 106 and the corresponding plurality of tool masks 208 for each image region 206 to a padding module 210. The padding module 210 is configured to generate a padded image region 212 for each image region 206, where each padded image region 212 includes a padded tool mask 214. The number of padded tool masks 214 generated by the padding module 210 is represented as the integer n, such that each tool mask 208 in the image region 206 is represented by a corresponding padded tool mask 214. Each padded image region 212 is generated by the padding module 210 as having a size that is designated by a tool parameter estimation network 218 implemented by a parameter estimation module 216 of the visual lens system 104. For instance, in some implementations the padded image region 212 is configured as a 128×128 pixel region.

Alternatively, the padding module 210 is configured to generate a padded image region 212 at any size suitable for input to the tool parameter estimation network 218. Regardless of a size of the padded image region 212, the padding module 210 generates the padded image region 212 as an image centered on the portion of the image region 206 detected as being processed by one of the digital tools corresponding to the respective tool mask 208. In scenarios where the image region 206 is larger than a size of the padded image region 212 to be generated for input to the tool parameter estimation network 218, the padding module 210 is configured to generate the padded image region 212 by cropping the image region 206 while maintaining the portion of the tool mask 208 indicating presence of a digital tool centered in the aperture of the padded tool mask 214.

Alternatively, in scenarios where the image region 206 is smaller than a size of the padded image region 212 to be generated, the padding module 210 is configured to generate each padded tool mask 214 by centering the region of the corresponding tool mask 208 indicating presence of a digital tool centered in the aperture padded tool mask 214 and adding pixels to the padded tool mask 214 with values indicating no presence of the digital tool until the appropriate width and height pixel dimensions are achieved.

Combinations of the foregoing are implemented by the padding module 210 in certain situations, such as a scenario where centering the region of the corresponding tool mask 208 indicating presence of a digital tool of in a corner of the image region 206 otherwise larger than the requisite size of the padded image region 212. In this manner, each padded tool mask 214 generated by the padding module 210 achieves a uniform size with a region of the corresponding tool mask 208 indicating presence of a digital tool in the image data 106 centered in the aperture of the padded tool mask 214.

Figure 4:
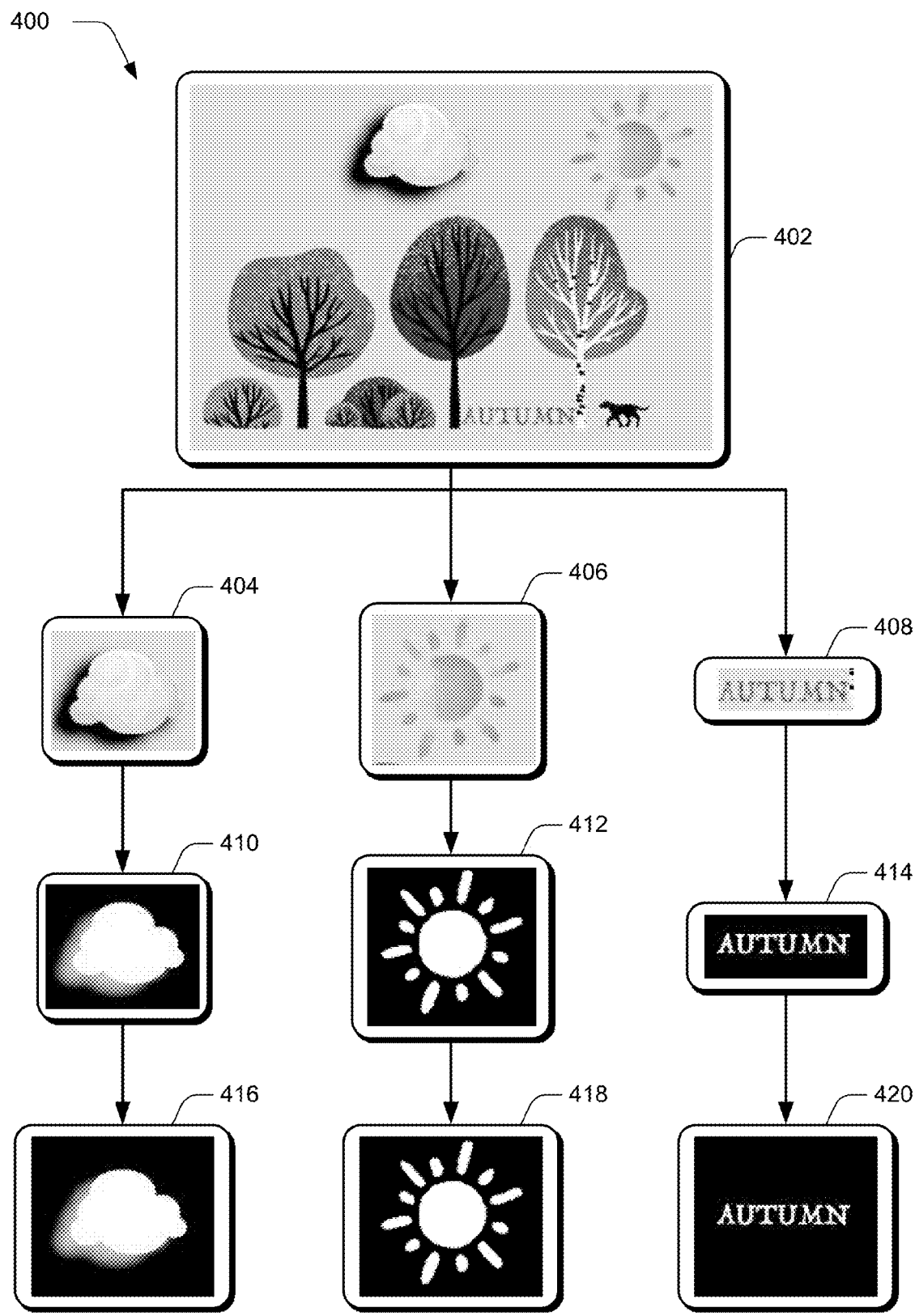
FIG. 4 depicts an example visualization of data utilized by the visual lens system of FIG. 1 in generating an interactive image from rasterized image data.

As shown in the example implementation 400 of FIG. 4, image data 402 is representative of an example instance of image data 106. Image regions 404, 406, and 408 are example instances of image region 206 identified by the tool region detection network 204 as having applied digital tools in the image data 402. As depicted in the example implementation 400, each of the image regions 404, 406, and 408 are of a different size and have corresponding tool masks 410, 412, and 414 indicating detection of a respective tool at the image regions 404, 406, and 408.

The padded tool masks 416, 418, and 420 are examples of the padded tool mask 214 generated by the padding module 210 from the tool masks 410, 412, and 414, respectively. As depicted in the example implementation 400, the padded tool masks 416, 418, and 420 are generated by the padding module 210 to have a uniform size that conforms to a data input size for the tool parameter estimation network 218. The padded tool mask 416, for instance, represents the tool mask 410 centered in the aperture of the padded tool mask 416, with padding around the tool mask 410 that indicates no detection of the digital tool corresponding to the tool mask 410 extending to satisfy a data input size for the tool parameter estimation network 218. The padding module 210 is configured to generate a padded image region 212 corresponding to each of the tool masks 410, 412, and 414 by copying a portion of the image data 402 at the data input size for the tool parameter estimation network 218 centered on the corresponding image region 206. For instance, in generating a padded image region 212 for the image region 408, the padding module 210 copies a portion of the image data 402 that is centered on the image region 408 in the image data 402 at the data input size corresponding to the padded tool mask 420.

The parameter estimation module 216 generates a concatenation of each padded image region 212 and corresponding padded tool mask 214 for the image data 106 and feeds the concatenations as input to the tool parameter estimation network 218. The tool parameter estimation network 218 is configured to automatically identify parameters 112 corresponding to the respective digital tool indicated by the padded tool mask 214 for each padded image region 212. A description of training the tool parameter estimation network 218 to automatically identify the parameters 112 is provided in further detail below. By virtue of the training process described herein, the tool parameter estimation network 218 is informed as to a discrete set of possible parameters 112 for the digital tool corresponding to the padded tool mask 214 and is further informed as to a discrete set of possible parameter configurations for each of the discrete set of possible parameters 112. In this manner, the tool parameter estimation network 218 generates the parameters 112 for each image region 206 as a classification problem by outputting a probability of the padded tool mask 214 representing each possible parameter configuration for each possible parameters 112 for the respective digital tool.

Figure 5:
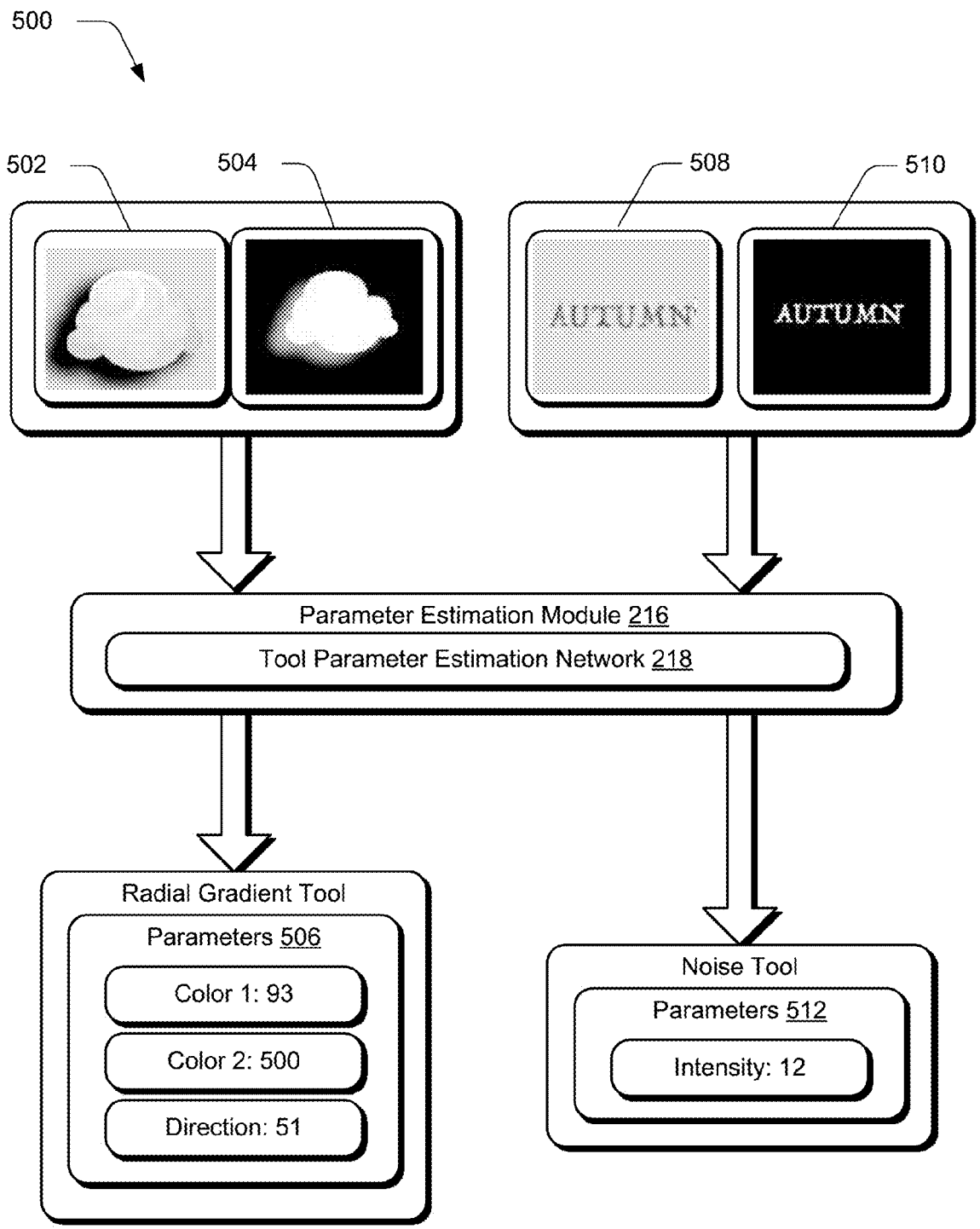
FIG. 5 depicts an example implementation showing operation of a tool parameter estimation network implemented by the visual lens system of FIG. 1 in greater detail.

The tool parameter estimation network 218 is configured to select, for each image region 206, the top-ranked configuration (i.e., the digital tool parameter configuration having the most likely probability) as the parameters 112 for the digital tool corresponding to the image region 206. As shown in the example implementation 500 of FIG. 5, padded image region 502 and a corresponding padded tool mask 504 are concatenated by the parameter estimation module 216 and provided as input to the tool parameter estimation network 218. Having been trained to recognize digital tools including at least a radial gradient tool and a noise tool, the tool parameter estimation network 218 determines from the padded tool mask 504 that the tool region detection network 204 identified use of a radial gradient tool at the image region 206 of the image data 106 corresponding to the padded image region 502. Based on this determination, the tool parameter estimation network 218 predicts, from a discrete set of possible parameters for the radial gradient tool, possible parameter configurations used to achieve the visual appearance of the padded image region 502. The tool parameter estimation network 218 then selects the most likely parameter configuration(s) and outputs the selected parameter configuration(s) as the parameters 112.

For instance, in the example implementation 500, the tool parameter estimation network 218 identifies that the radial gradient tool includes three discrete parameters: a "Color 1" parameter, a "Color 2" parameter, and a "Direction" parameter. The tool parameter estimation network 218 then identifies that the most likely "Color 1" value used to achieve the visual appearance of padded image region 502 is "93," that the most likely "Color 2" value used to achieve the visual appearance of padded image region 502 is "500," and that the most likely "Direction" value used to achieve the visual appearance of padded image region 502 is "51." Collectively, these most likely parameter configuration values are output as parameters 506 for the radial gradient tool represented by the padded tool mask 504.

In a similar manner, the padded image region 508 and a corresponding padded tool mask 510 are concatenated by the parameter estimation module 216 and provided as input to the tool parameter estimation network 218. The tool parameter estimation network 218 determines that the padded tool mask 510 corresponds to a noise tool detected at the image region 206 of the image data 106 corresponding to the padded image region 508. Based on this determination, the tool parameter estimation network 218 predicts, from a discrete set of possible parameters for the noise tool, possible parameter configurations used to achieve the visual appearance of the padded image region 508. The tool parameter estimation network 218 then selects the most likely parameter configuration(s) and outputs the selected parameter configuration(s) as the parameters 112. For instance, in the example implementation 500, the tool parameter estimation network 218 identifies that the noise tool is associated with a single possible parameter that specifies an "Intensity" of the noise tool. The tool parameter estimation network 218 then identifies that the most likely "Intensity" value used to achieve the visual appearance of the padded image region 508 is "12" and outputs this predicted parameter configuration as the parameters 512 for the noise tool represented by the padded tool mask 510.

The parameter estimation module 216 then communicates the determined parameters 112 for each image region 206 to the tool description module 220, which is configured to generate an image tool description 110 for the image region 206. The image tool description 110 provides information identifying the parameters 112 and the corresponding digital tool used to achieve a visual appearance of the image region 206. Information included in the image tool description 110 is presented in various possible configurations, such as a graphic rendering, a textual description, an audible description, combinations thereof, and so forth. In some implementations, the image tool description 110 includes additional controls and/or information pertaining to the digital tool used to achieve the visual appearance of the image region 206. The image tool description 110 is then incorporated into the image data 106 and output by the rendering module 222 as the interactive image 120 for the image data 106.

Figure 6:
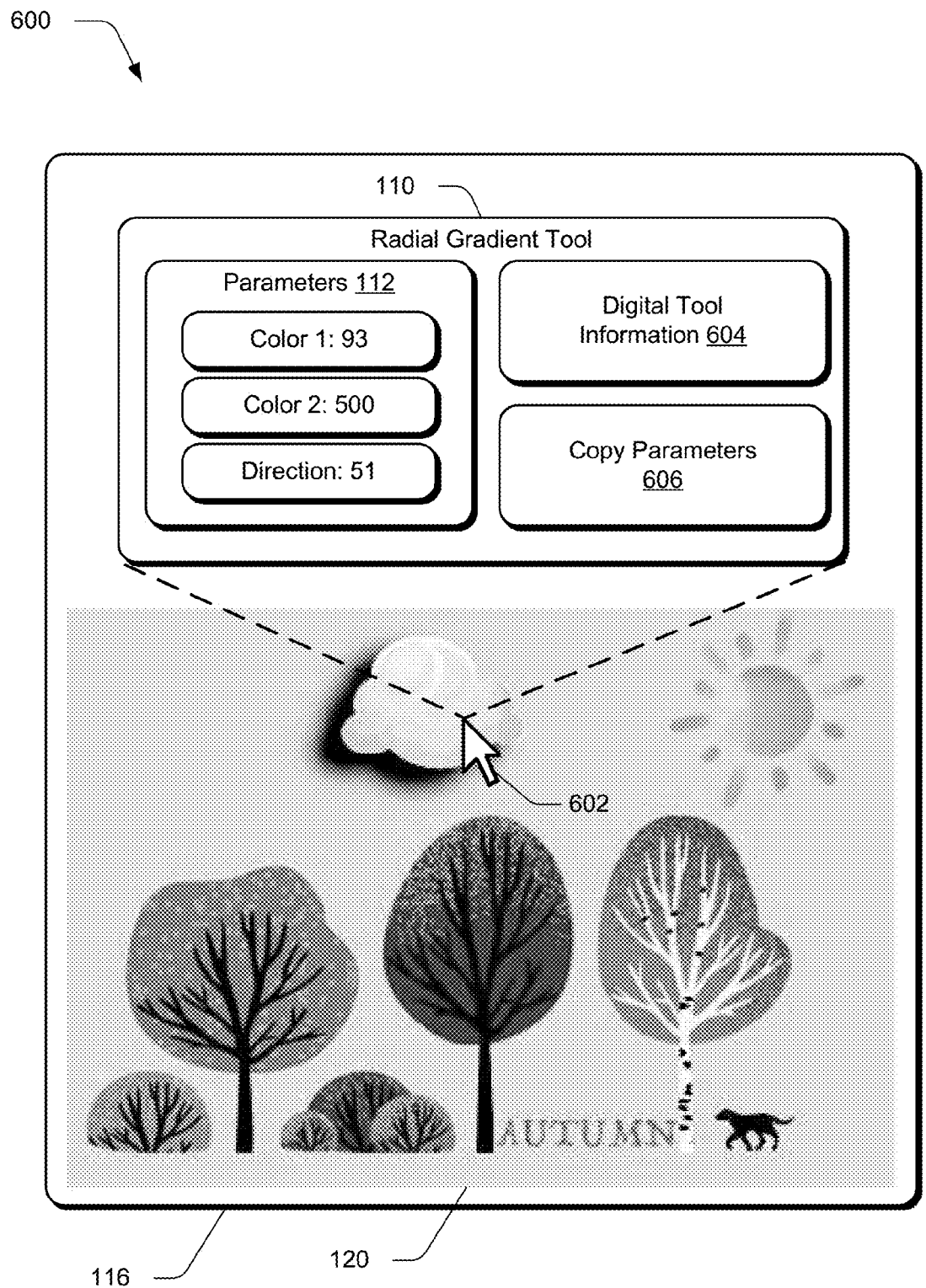
FIG. 6 depicts an example of a user interface including an interactive image generated from rasterized image data by the visual lens system of FIG. 1.

For instance, the example implementation 600 of FIG. 6 illustrates an interactive image 120 output in the user interface 116 of the visual lens system 104, as generated from image data 402. The example implementation 600 depicts a cursor 602 representing user input to the interactive image 120 at a region of the interactive image 120 including a display of a cloud (e.g., the region of the interactive image 120 including the image region 404). Responsive to receiving input at a portion of the interactive image 120 including an image region 206 that includes a detected digital tool used to achieve a visual appearance of the portion, the visual lens system 104 is configured to display the image tool description 110 for the image region 206. In the example implementation 600, the image tool description 110 indicates that a radial gradient tool with parameters 112 was used to achieve the visual appearance of the depicted cloud. The image tool description 110 further includes controls 604 and 606, which are each selectable via user input to cause performance of actions pertaining to the digital tool identified by the image tool description 110 (e.g., the radial gradient tool).

Control 604 includes an option to access "Digital Tool Information" corresponding to the digital tool identified by the image tool description 110. For instance, responsive to selection of the control 604, the visual lens system 104 presents additional information describing the radial gradient tool in the user interface 116. In some implementations, such additional information includes a user manual for the radial gradient tool, a link to instructional material for using the radial gradient tool, a visual indication of where to access the radial gradient tool in the user interface 116, combinations thereof, and so forth.

In this manner, the image tool description 110 not only identifies the digital tool used to achieve the visual appearance of a selected image region 206 in the interactive image 120, but further assists a user of the visual lens system 104 in becoming familiar with use of the digital tool for their own projects. In addition to educating users of the visual lens system 104 regarding potential applications of identified digital tools, the visual lens system 104 enables users to directly import parameters 112 into their own creations.

For instance, control 606 includes an option to "Copy Parameters" identified by the image tool description 110. Responsive to selection of the control 606, the visual lens system 104 stores (e.g., in storage device 108), information describing the digital tool identified by the image tool description 110 as well as the specific parameter configuration for the digital tool as represented by the parameters 112. For instance, in the example implementation 600, selection of the control 606 causes the visual lens system 104 to store the radial gradient tool and its associated parameters of "Color 1: 93," "Color 2: 500," and "Direction: 51" for subsequent use by the visual lens system 104. In this manner, a user of the visual lens system 104 is able to browse different image data 106 for inspiration in generating their own work and save aspects of the image data 106 to be used in their own work for subsequent access.

Figure 7:
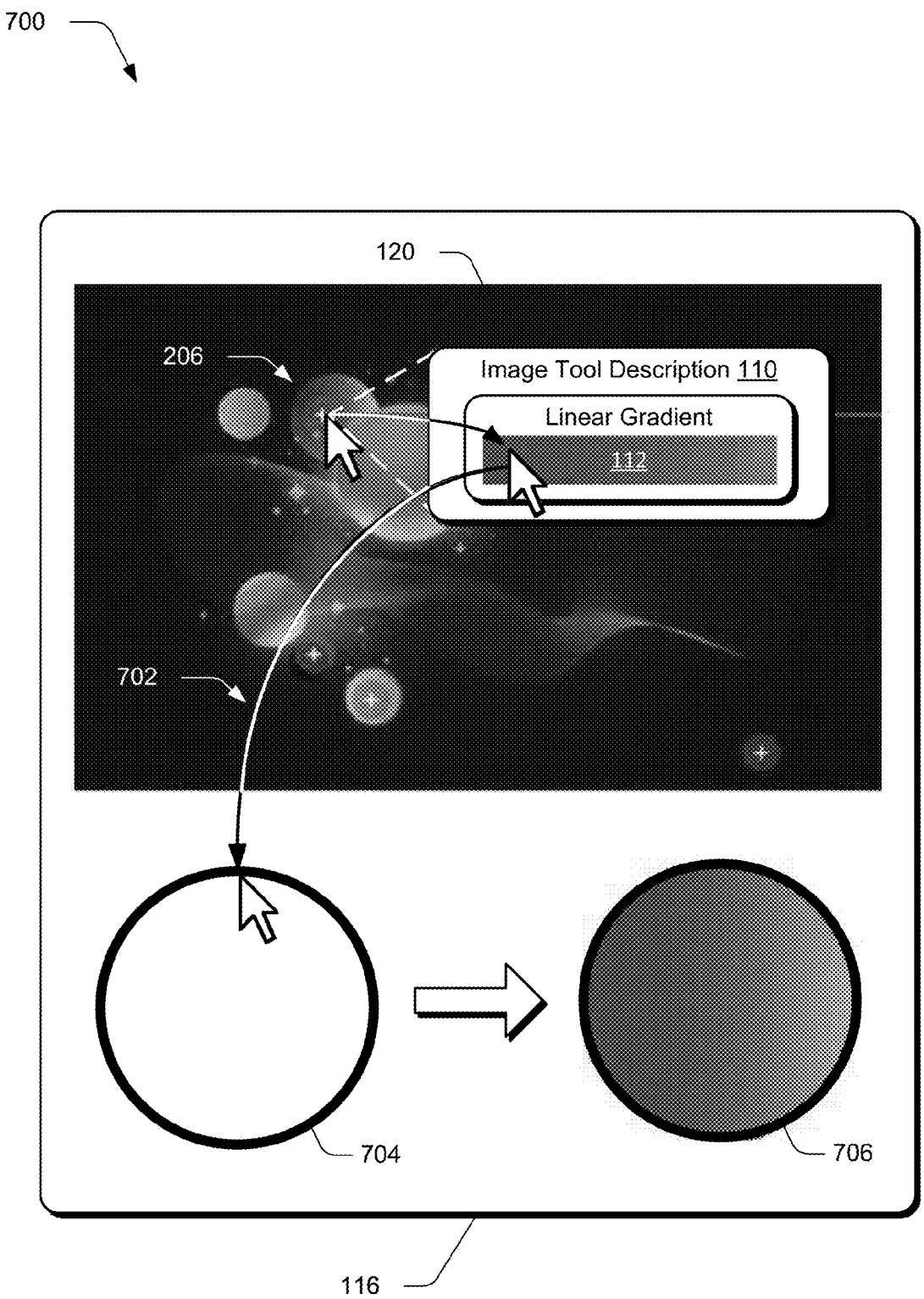
FIG. 7 depicts an example of a user interface including an interactive image generated from rasterized image data by the visual lens system of FIG. 1.

The example implementation 700 of FIG. 7 illustrates an interactive image 120 in which parameters 112 of an image tool description 110 are transferred to different image data. For instance, the example implementation 700 depicts an interactive image 120 as displayed in a user interface 116 of the visual lens system 104. The interactive image 120 is depicted as displaying an image tool description 110 for an image region 206 selected by user input (e.g., selected via a cursor click). In the example implementation 700, the image region 206 is visually indicated as detected by the visual lens system 104 as having a visual appearance generated by a digital tool, such that a user viewing the interactive image 120 is informed that interacting with (e.g., selecting) the image region 206 causes display of the image tool description 110. In implementations, the image region 206 is indicated as having a visual appearance achievable via a digital tool by visually distinguishing the image region 206 from a remainder of the interactive image 120. For example, the example implementation 700 depicts a selectable icon over the image region 206 in the form of a blue circle with a white "+" symbol, indicating that the image region's 206 visual appearance is achievable via a digital tool. Responsive to selection of the selectable icon, the example implementation 700 displays a visual representation of the parameters 112 for a linear gradient digital tool used to generate a visual appearance of the image region 206, as part of the image tool description 110 displayed responsive to selection of the image region 206.

In the example implementation 700, user input is depicted as progressing along path 702 from selection of the image region 206 to selection of the parameters 112 and transferring the parameters 112 to other image data 704 displayed in the user interface 116. Selection of the parameters 112 is enabled by the visual lens system 104 in various manners, such as via selection of the control 606 as illustrated in the example implementation 600, via a drag-and-drop input operation, and so forth. As depicted in the example implementation 700, selection and transfer of the parameters 112 to the image data 704 causes the parameters 112 of the linear gradient specified in image tool description 110 to be transferred to the image data 704, which modifies image data 704 to have a visual appearance as indicated by image data 706.

In this manner, the visual lens system 104 enables a user to directly transfer parameters 112 of a digital tool from a rasterized image to different image data, while preserving the parameters 112 in a manner that enables further customization of the parameters 112 by the visual lens system 104 (e.g., via user input to the user interface 116). In some implementations, transfer of digital tool parameters 112 from image data 106 to different image data is accompanied by causing display of a widget or control interface for the digital tool to which the parameters 112 pertain. Such display of the widget or control interface is automatically populated with the parameters 112 and enables further refinement of the parameters 112 via individual controls that each pertain to one of the discrete parameters 112 for the digital tool.

Having considered example implementations of the visual lens system 104, consider now example techniques for generating a tool region detection network 204 and a tool parameter estimation network 218 to enable performance of the techniques described herein.

Figure 8A:
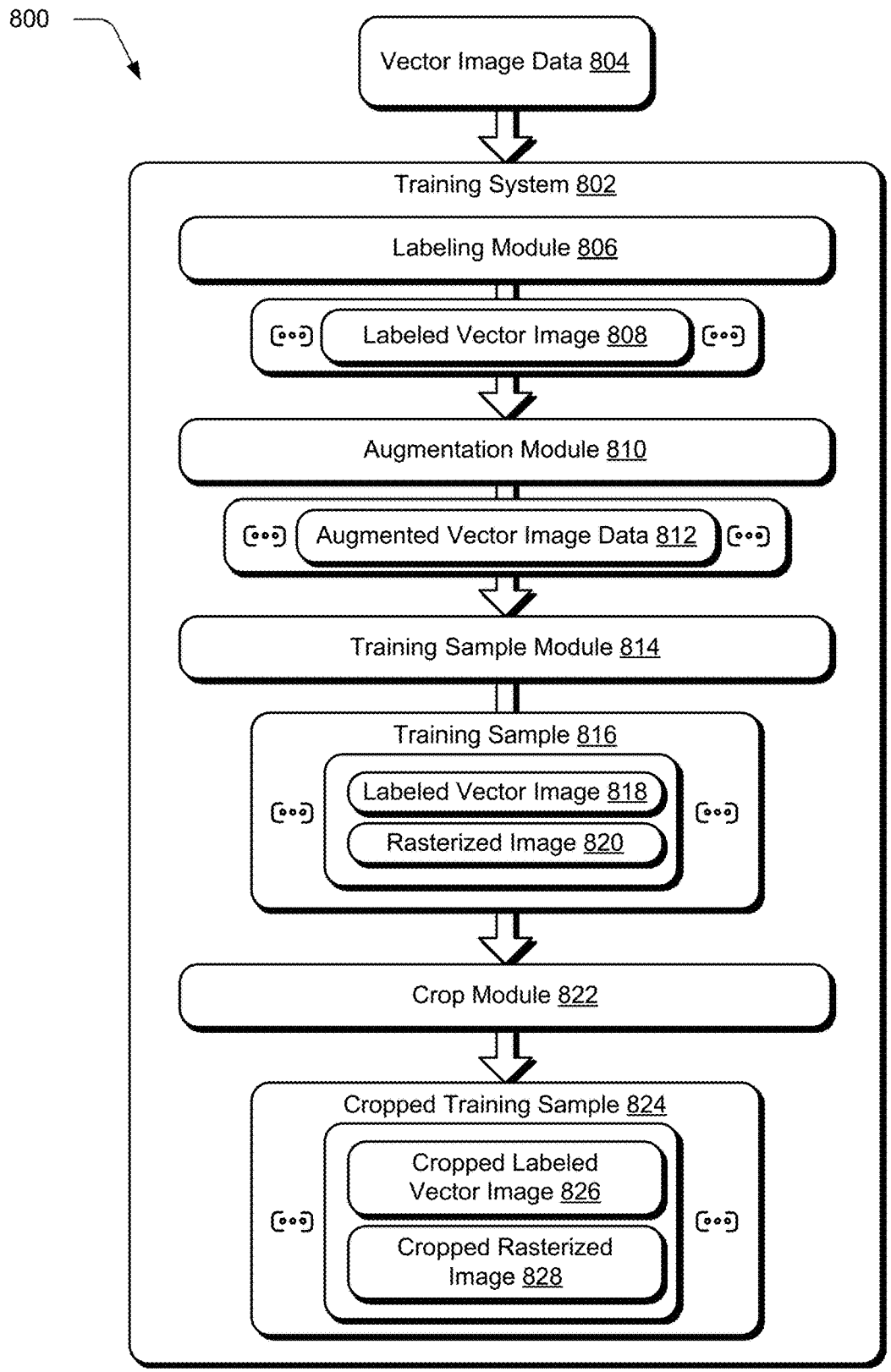
FIGS. 8A and 8B depict a system in an example implementation of generating the tool region detection network and the tool parameter estimation network implemented by the visual lens system of FIG. 1.
Figure 8B:
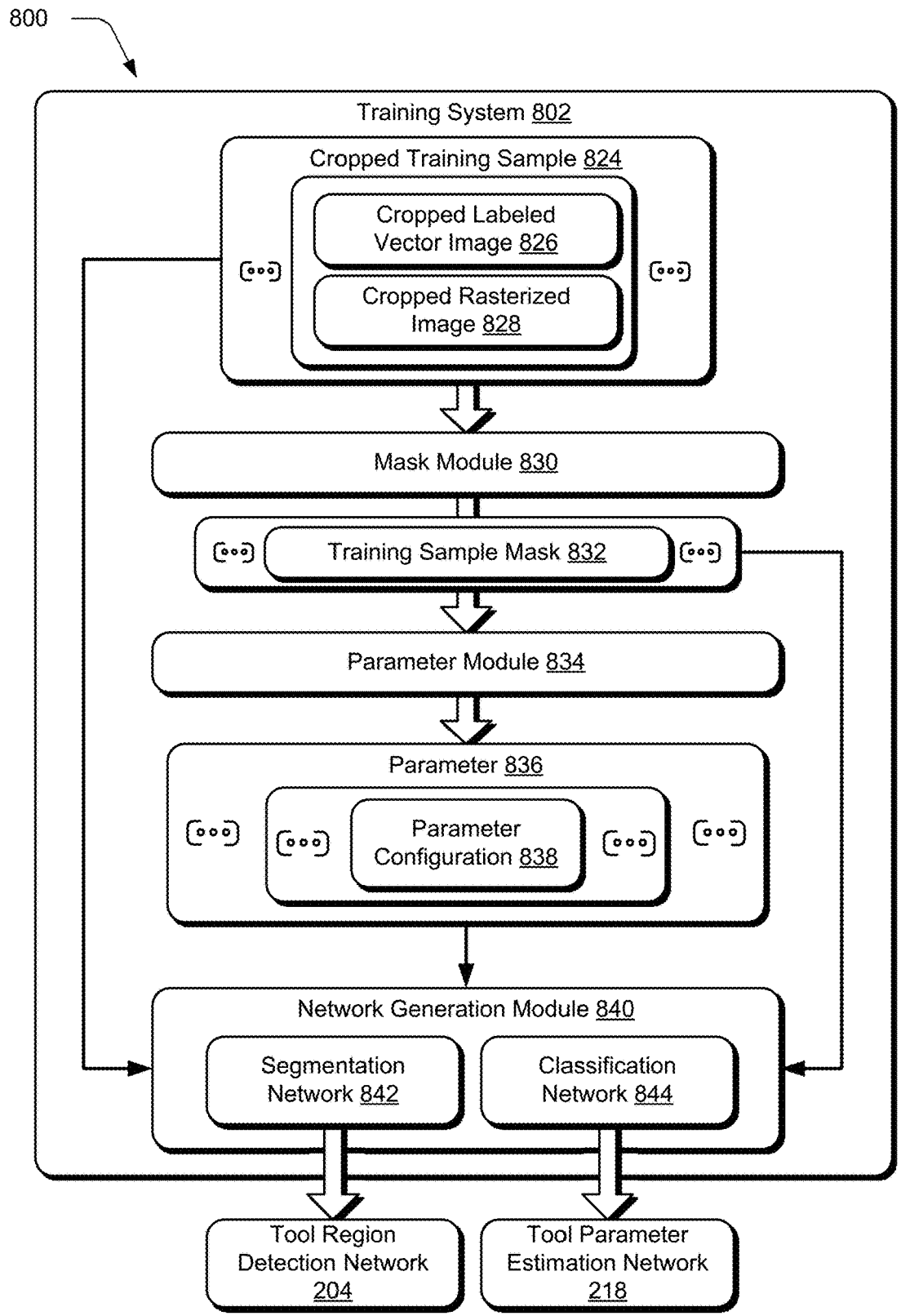

FIGS. 8A and 8B illustrate an example implementation 800 of generating a tool region detection network 204 trained to automatically identify use of a plurality of different digital tools in rasterized image data 106 and generating a tool parameter estimation network 218 trained to automatically ascertain parameter configurations for individual ones of the digital tools as used to generate the rasterized image data 106. In some implementations, the training system 802 is representative of functionality of the visual lens system 104 to generate the trained tool region detection network 204 and trained tool parameter estimation network 218. Alternatively, in some implementations the training system 802 is implemented remotely from the visual lens system 104, such as at a different computing device than computing device 102, which communicates the trained tool region detection network 204 and tool parameter estimation network 218 to the visual lens system 104.

To begin, vector image data 804 is obtained by the training system 802. The vector image data 804 is representative of a plurality of vector images that each have one or more digital tools applied to at least a portion of the vector image. The training system 802 implements a labeling module 806 that is configured to ascertain a type of digital tool applied to each vector image in the vector image data 804 and generate a labeled vector image 808 for each image in the vector image data 804 that identifies the applied digital tool. In addition to identifying the type of digital tool applied to each vector image, the labeled vector image 808 represents information identifying one or more parameters of the digital tool used to stylize at least a portion of the vector image, along with parameter configurations for each of the one or more parameters. In implementations, the labeling module 806 is configured to generate the vector image 808 automatically (e.g., independent of user input), via explicit user input, or combinations thereof.

For instance, the labeling module 806 is configured to automatically identify a type of digital tool applied to a vector image of the vector image data 804 by inspecting metadata of the vector image that describes both a region of the vector image at which a digital tool was applied, and the particular type of digital tool applied to the region. In implementations where the labeling module 806 automatically identifies the type of digital tool, the labeling module 806 is configured to implement an image segmentation network, such as a Mask R-CNN architecture, a SpineNet architecture, and so forth. In an example implementation where a Mask R-CNN architecture is implemented by the labeling module 806, example parameters include 300 regions of interest, a batch size of four, use of a ResNeXt backbone, and a learning rate of 0.001 with an Adam optimizer. These example parameters are merely illustrative of one example implementation, and different parameters are useable in different implementations.

In an implementation where user input is utilized to identify a digital tool type applied to the vector image, a user of the computing device implementing the training system assigns a label to individual images of the vector image data 804 by manually specifying (e.g., selecting from a list, textually describing, etc.) a digital tool used to achieve a visual appearance of the image. In implementations where a combination of automatic and user input-based labeling approaches are utilized, user input is leveraged to verify an accuracy of a labeled vector image 808 generated by the labeling module 806. In this manner, each vector image 808 represents an instance of a vector image included in the vector image data 804 with associated information identifying a digital tool used to achieve a visual appearance of individual geometry elements in the vector image.

Example digital tools identified by the vector image 808 include, but are not limited to, linear gradient, radial gradient, freeform gradient, shadow, glow, noise, Gaussian blur, halftone, and brush tools. In implementations, the particular digital tools identified by the vector image 808 are tailored for a particular digital graphics editing software in which the visual lens system 104 is to be implemented. In this manner, the vector image 808 are not limited to labeling the example digital tools described herein and are representative of identifying any type of digital tool that is useable to adjust, modify, or define a visual appearance of vector graphics data.

The labeling module 806 provides a plurality of vector image 808 to an augmentation module 810, which is configured to generate at least one augmented version of each vector image 808. An augmented version of a vector image 808 is generated by altering a geometry element to which a digital tool is applied in the vector image 808. For instance, the augmentation module 810 generates an augmented version of the vector image 808 by varying a position of a stylized geometry element (e.g., an image region of a vector image stylized via application of one or more digital tools) in the vector image 808. Alternatively or additionally, the augmentation module 810 generates an augmented version of the vector image 808 by varying a size of the stylized geometry element in the vector image 808. Alternatively or additionally, the augmentation module 810 generates an augmented version of the vector image 808 by varying one or more underlying colors of the stylized geometry element, thereby generating a different appearance of a same effect applied by one or more digital tools to the vector image 808.

Alternatively or additionally, the augmentation module 810 generates an augmented version of the vector image 808 by varying at least one parameter of the digital tool applied to the stylized geometry element (e.g., changing a radius of a Gaussian blur digital tool, an intensity value of a noise tool, and so forth). Alternatively or additionally, the augmentation module 810 generates an augmented version of the vector image 808 by varying a hierarchical placement (e.g., z-order placement) of at least one stylized geometry element in the vector image such that a portion of the at least one stylized geometry element is visually occluded by at least one other geometry element in the vector image. Alternatively or additionally, the augmentation module 810 generates an augmented version of the vector image 808 by copying a stylized geometry element from one vector image in the vector image data 804 and inserting the stylized geometry element to another vector image in the vector image data 804, thereby enabling visualization of the same stylized geometry element against different backdrops. The vector image data 812 thus represents labeled vector images included in the vector image data 804 that are diversified to reflect different manners in which same digital tools are applied to achieve varying visual appearances. For instance, a single instance of a vector image 808 is augmented in a plurality of different manners as indicated above to represent different visual appearances of image data that are achievable via use of the digital tool corresponding to the label of the vector image 808, when the plurality of augmented instance of the vector image 808 are included in the vector image data 812.

Each augmented version of a vector image 808 is assigned the same label as the vector image 808 that identifies a digital tool used to generate the stylized geometry element modified as part of the augmentation. The augmented and labeled versions of the vector image 808 are then output by the augmentation module 810 as augmented vector image data 812. From the vector image data 812, a training sample module 814 generates a plurality of pairwise training samples 816. Each of the training samples 816 include a labeled vector image 818 obtained from the vector image data 812 and a corresponding rasterized image 820 that represents a rasterization of the labeled vector image 818.

In contrast to the labeled vector image 818, which includes metadata that identifies various geometry elements as constrained by points and connecting lines (e.g., splines, Bezier curves, etc.) and one or more attributes that define a visual appearance of the geometry elements, the rasterized image 820 includes only pixel value information specifying a color depicted by individual pixels in the form of bits. The labeled vector image 818 thus serves as a ground truth representation for the rasterized image 820, indicating whether a digital tool represented by a label associated with the labeled vector image 818 is used to achieve a visual appearance of pixels in the rasterized image 820. The rasterized image 820 of various training samples 816 is rasterized at varying resolutions, such as ranging from 320 pixels to 1024 pixels per rasterized image 820. By varying the resolution of rasterized image 820 included in training samples 816, the training system 802 is configured to generate trained instances of the tool region detection network 204 and tool parameter estimation network 218 that accurately accommodate a range of different image data 106 resolutions.

The training samples 816 are provided to a crop module 822, which is configured to generate at least one cropped training sample 824 for each training samples 816. Each cropped training sample 824 includes a cropped labeled vector image 826 and a cropped rasterized image 828. The cropped labeled vector image 826 represents a cropped instance of the labeled vector image 818, and the cropped rasterized image 828 represents a similarly cropped instance of the rasterized image 820, of the corresponding training samples 816 from which the 824 was generated. Each of the cropped labeled vector image 826 and the cropped rasterized image 828 includes the stylized geometry element of the base vector image 808 from which they were generated in aperture of the crop, thereby accounting for different sized and different visual saliencies of image regions 206 included in the image data 106 processed by the visual lens system 104. In implementations, an aperture size including the cropped labeled vector image 826 and cropped rasterized image 828 of a cropped training sample 824 is generated at random by the crop module 822, such that cropped training samples 824 are sized differently, relative to one another.

Continuing to FIG. 8B, the crop module 822 passes the cropped training sample 824 to mask module 830. The mask module 830 is configured to generate a training sample mask 832, which serves as a ground truth for the cropped training sample 824. To do so, the mask module 830 creates a mask encompassing a geometry of the stylized geometry element represented in the cropped labeled vector image 826, which is then dilated and rasterized against a black backdrop. In this manner, the training sample mask 832 represents a ground truth that is to be output by the trained tool region detection network 204 responsive to receiving input of the corresponding cropped rasterized image 828 from which the training sample mask 832 was generated.

The cropped training sample 824 and training sample mask 832 are further communicated to parameter module 834 for use in creating a set of parameters 836 and associated parameter configurations 838 for each of the plurality of digital tools represented in the cropped training sample 824. To do so, the parameter module 834 identifies possible parameters 836 that are useable to control the corresponding digital tool used to generate the stylized geometry element included in the cropped labeled vector image 826. For each parameter 836, the parameter module 834 identifies possible parameter configurations 838 of the parameter 836.

For instance, in an example implementation where the cropped labeled vector image 826 includes a stylized geometry element generated via application of a "Noise" digital tool, the parameter module 834 identifies that a single "Intensity" parameter 836 is useable to control the "Noise" tool. Control of the "Intensity" parameter 836 is identified as being specifiable in percentage value ranging from one to 100 in single percentile increments. Consequently, the parameter module 834 identifies that the "Noise" tool used to generate cropped labeled vector image 826 includes a single "Intensity" parameter 836, with 100 discrete parameter configurations 838 (e.g., 1, 2, . . . 100).

As another example, in an implementation where the cropped labeled vector image 826 includes a stylized geometry element generated via application of a "Linear Gradient" digital tool, the parameter module 834 identifies that three parameters 836 are useable to control the "Linear Gradient" tool: a first color value, a second color value, and a direction value. Control of the first and second color values are identified as being specifiable as an integer value ranging from zero to 256 (e.g., colors displayable by an 8-bit pixel depth) and control of the direction value is identified as being specifiable in degrees as an integer value ranging from 1 to 360. Consequently, the parameter module 834 identifies that the "Linear Gradient" includes three parameters 836, with respective parameter configurations 838 for the three parameters including 257 discrete options (e.g., for the first and second color values) and 360 discrete options (e.g., for the direction value).

As yet another example, in an implementation where the cropped labeled image 826 includes a stylized geometry element generated via application of a "Drop Shadow" digital tool, the parameter module 834 identifies that six parameters 836 are useable to control the digital tool: mode, opacity, X and Y offset values, blur, color, and darkness. For instance, the mode specifies a blending mode for the drop shadow, the opacity specifies a percentage opacity for the drop shadow, the X and Y offset values specify a distance for offsetting the drop shadow from a geometry element, the blue specifies the distance from the edge of the shadow at which blurring is to occur, color specifies a color of the shadow, and darkness specifies a percentage of black to be added for the shadow (e.g., 0% to 100% added black).

In yet a further example, in an implementation where the cropped labeled image 826 includes a stylized geometry element generated via application of an "Inner/Outer Glow" digital tool, the parameter module 834 identifies that three to five parameters 836 are useable to control the digital tool: mode, opacity, blur, center, and edge. The mode specifies a blending mode for the glow, the opacity specifies a percentage opacity for the glow, and the blur specifies a distance from the center or edge of a selection in the geometry element where blurring is to occur. The center and edge parameters are example parameters 836 that function only when the Inner/Outer Glow digital tool is applied as Inner Glow, with the center applying a glow emanating from a center of the geometry element and the edge applying a glow that emanates from inside edges of the geometry element, respectively. Thus, the parameter module 834 is representative of functionality of the training system 802 to identify possible manners in which the digital tools used to generate the cropped labeled vector image 826 are configurable, in terms of parameters 836 and their respective parameter configurations 838.

The cropped training samples 824, the training sample mask 832, and the parameters 836 generated by the training system 802 are then communicated to a network generation module 840 for use in training the tool region detection network 204 and the tool parameter estimation network 218. To train the tool region detection network 204, the network generation module 840 implements a segmentation network 842, which is representative of a semantic segmentation network architecture, such as a ResNet18 backbone. Alternatively, the segmentation network 842 is implemented as a UNet architecture, a Dilated ResNet architecture, a Gated-SCNN, or the like. In training the tool region detection network 204, the network generation module 840 provides as input to the segmentation network 842 the cropped rasterized image 828 of the cropped training samples 824 and causes the segmentation network 842 to output a classification for each pixel of the cropped rasterized image 828 indicating whether a certain digital tool is detected as being applied to the pixel. This classification is performed for each of a plurality of different digital tool types and is not limited to the example digital tool types described herein.

In implementations, the cropped rasterized image 828 is fed to the segmentation network 842 as a 3-channel image tensor with arbitrary width W and height H and the segmentation network 842 is caused to output a single channel for each of the plurality of tools T. In some implementations, the single channel output by the segmentation network 842 for each T is generated at a reduced resolution (e.g., W/8 and H/8). For instance, when the segmentation network 842 is implemented as a ResNet18 backbone, the segmentation network 842 downsamples the input cropped rasterized image 828 to W/16 and H/16 before applying an upconvolution block to generate a tensor of size (batch×H/8×W/8× T). As an example, training of the tool region detection network 204 is performed using a two-class cross-entropy loss for each tool T (e.g., tool present at pixel vs. tool not present at pixel) with a batch size of 32 and a learning rate of $1e^{-4}$.

During training, the network generation module 840 filters outputs generated by the segmentation network 842 to remove weak detections and smooth detected regions until the output of the segmentation network 842, given the cropped rasterized image 828 as input, matches the training sample mask 832. For instance, the network generation module 840 resizes individual outputs generated by the segmentation network 842 to an original resolution of the vector image 808 from which the cropped rasterized image 828 was generated and assign binary tool detection values to each pixel of the resized binary mask based on a designated threshold. For instance, if the designated threshold is set to 0.5, the network generation module 840 assigns all pixels in the mask output by the segmentation network 842 indicating a "tool present" confidence value of greater than or equal to 0.5 a value of one, while assigning all pixels not having a "tool present" confidence value satisfying the 0.5 threshold a value of zero. The resulting binary mask indicating either "tool present" or "tool not present" at each pixel is then dilated and eroded (e.g., dilated by five pixels and eroded by five pixels). Binary masks are then optionally rejected based on a determination of whether their included pixel count satisfies a pixel count threshold (e.g., a $25^2$ pixel threshold). The resulting binary mask for a given tool is compared relative to the corresponding ground truth training sample mask 832 for the tool and a result of the comparison is used to guide learning (e.g., by adjusting one or more internal weights) of the tool region detection network 204 until training is complete (e.g., until the tool region detection network 204 generates the training sample mask 832 as an output for the corresponding cropped rasterized image 828 provided as input).

To train the tool parameter estimation network 218, the network generation module 840 quantizes each parameter 836 for a particular digital tool into a discrete set of buckets, where the number of discrete buckets for each parameter 836 is defined by the parameter configuration 838 as determined by the parameter module 834. By quantizing parameters 836 for a particular tool into discrete buckets, the training system 802 reduces the problem to be solved by the tool parameter estimation network 218 to a classification problem rather than a regression of tool parameters objective. Accordingly, to generate the tool parameter estimation network 218, the network generation module 840 implements a classification network 844.

The classification network 844 is representative of a range of different image classification networks such as the ResNet18 backbone used as the segmentation network 842 in accordance with one or more implementations, pre-trained with an ImageNet classifier. Alternatively, in accordance with one or more implementations, the network generation module 840 is configured to perform the pre-training of a ResNet18 backbone with the ImageNet classifier to generate classification network 844.

For each cropped training sample 824, the appropriate digital tool used in generating the cropped rasterized image 828 is identified from the cropped labeled vector image 826. The network generation module 840 then identifies the associated one or more parameters 836 for the identified digital tool as well as the possible parameter configurations 838 for each of the one or more parameters 836 and passes the identified parameters 836 and their associated parameter configurations 838 with the training sample mask 832 corresponding to the cropped training sample 824 as input to the classification network 844. Specifically, the network generation module 840 concatenates the cropped rasterized image 828 and the corresponding training sample mask 832 and provides the concatenation as input to the classification network 844.

The objective function upon which the classification network 844 is trained to generate the tool parameter estimation network 218 thus causes the classification network 844 to generate, for each of the discrete buckets represented by individual parameter configurations 838 of each digital tool parameter 836, a confidence value as to whether the particular parameter configuration 838 for the digital tool parameter 836 was used to achieve the training sample mask 832. In this manner, the output of the classification network 844 for each cropped training sample 824 represents a probability distribution of the different possible parameter configurations 838 for a parameter 836 of a digital tool identified by the cropped labeled vector image 828 used in the cropped rasterized image 828.

For instance, consider an example implementation where the cropped labeled vector image 826 indicates that a "Glow" digital tool was used to achieve a visual appearance of the cropped rasterized image 828, and a corresponding parameter 836 for the "Glow" digital tool includes a radius parameter having 500 different possible parameter configurations 838. In such an example implementation, the network generation module 840 causes the classification network 844 to assign a confidence value indicating whether the parameter configuration 838 was used to achieve the visual appearance of the cropped rasterized image 828 for each of the 500 different parameter configurations 838.

In an example scenario where the tool parameter estimation network 218 is generated from a ResNet18 classifier pre-trained with an ImageNet classifier implementation of the classification network 844, the network generation module 840 defines an input data size for the tool parameter estimation network 218 and formats training data to the appropriate input data size. For instance, the network generation module 840 is configured to specify a 128×128 input data size and process each cropped rasterized image 828 used as training data into a 128×128 image centered on the stylized geometry element identified by the label in the corresponding cropped labeled vector image 826. The ResNet18 backbone then transforms an input 128×128×4 image into a 2048 feature vector, and uses a different fully-connected linear layer to match into each parameter 836 set and associated parameter configuration 838 buckets for each digital tool identified by a copped labeled vector image 826 in the cropped training samples 824.

The network generation module 840 proceeds to train the tool parameter estimation network utilizing a plurality (e.g., 8) of different cropped training samples 824 corresponding to a particular digital tool, providing the cropped rasterized images 828 of the plurality as input to the classification network 844, and utilizing standard cross-entropy loss for each tool parameter 836, with a learning rate of $1e^{-3}$. The confidence values for each bucket represented by a different parameter configuration 838 for a corresponding parameter 836 of the digital tool used to generate the cropped training sample 824 processed by the classification network 844 are used by the network generation module 840 to select a top-ranked parameter configuration 838 for each parameter 836 as the predicted digital tool parameters used to generate the cropped rasterized image 828. The predicted digital tool parameters for a cropped rasterized image 828 are then compared against metadata included in the cropped labeled vector image 826 corresponding to the cropped rasterized image 828 to verify the prediction against ground truth digital tool parameters. Results of the ground truth comparison are used to guide learning (e.g., by adjusting one or more internal weights) of the tool parameter estimation network 218 until training is complete (e.g., until the tool parameter estimation network 218 predicts the parameter(s) 836 and corresponding parameter configuration(s) 838 as identified in the cropped labeled vector image 826 corresponding to a training sample mask 832, when provided the training sample mask 832 as input).

The trained tool region detection network 204 and the trained tool parameter estimation network 218 are subsequently implementable by the visual lens system 104 to automatically generate an interactive image 120 from rasterized image data 106 in accordance with the techniques described herein.

Having considered example systems and techniques for generating an interactive image from raster image data and training a tool region detection network and a tool parameter estimation network used therein, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-8B.

Figure 9:
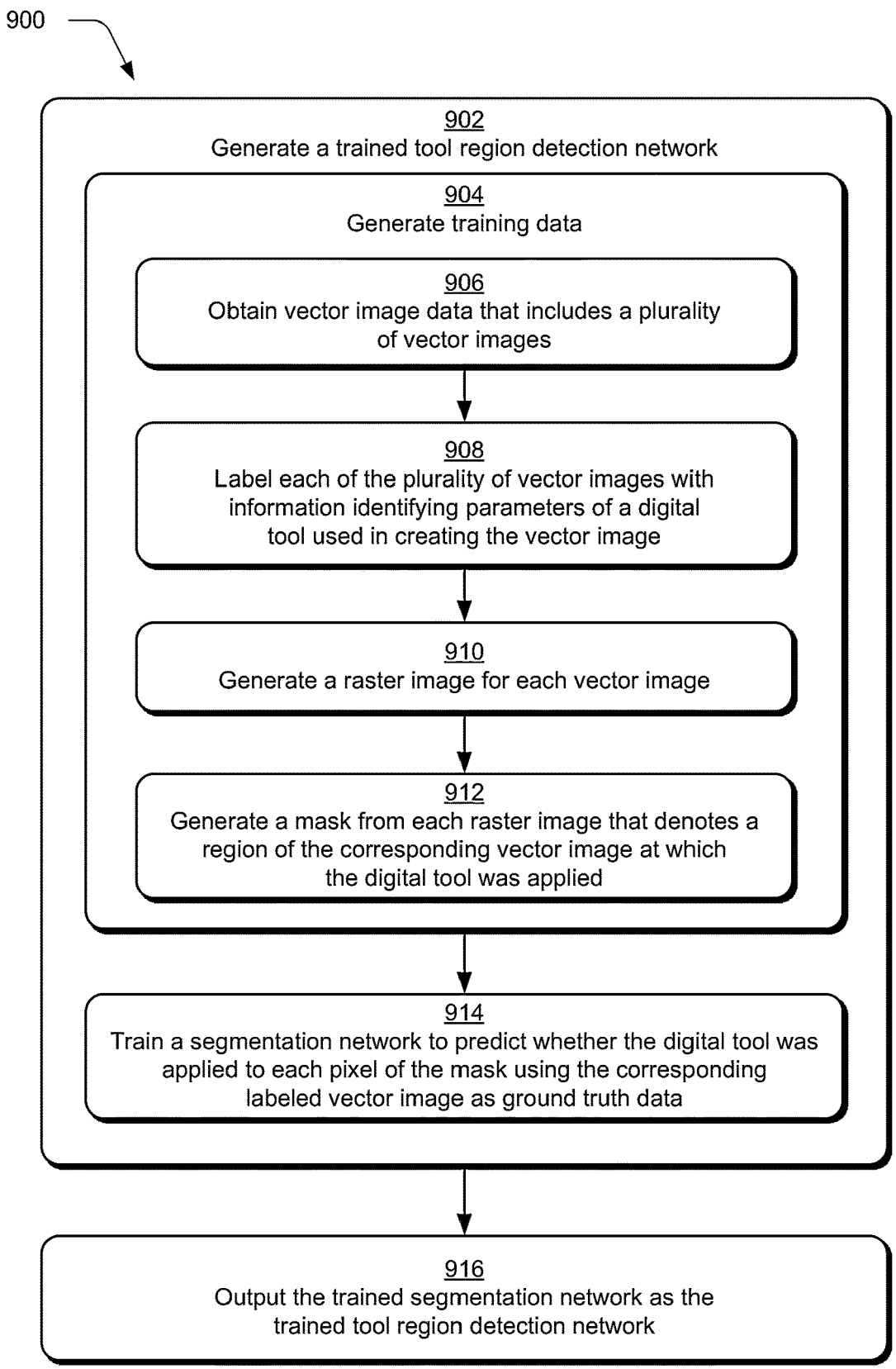
FIG. 9 is a flow diagram depicting a procedure in an example implementation of training a tool region detection network used by the visual lens system of FIG. 1 to generate an interactive image from rasterized image data.

FIG. 9 depicts a procedure 900 in an example implementation of generating a trained tool region detection network (block 902) that is useable by the visual lens system 104 to generate the interactive image 120 from image data 106 in accordance with the techniques described herein. In accordance with one or more implementations, procedure 900 is performed by the training system 802 to generate the tool region detection network 204. In order to generate the trained tool region detection network, training data is generated (block 904) by first obtaining vector image data that includes a plurality of vector images (block 906). The training system 802, for instance, obtains vector image data 804.

Each of the plurality of vector images are then labeled with information identifying a digital tool and one or more parameters used to stylize at least one geometry element in the vector image (block 908). The labeling module 806, for instance, generates labeled vector images 808. Optionally, as part of generating the training data (block 904), the augmentation module 810 generates augmented vector image data 812 from the labeled vector images 808. In accordance with some implementations, the training system 802 generates the training data without generating the augmented vector image data 812.

A raster image is then generated for each vector image (block 910). The training sample module 814, for instance, generates a rasterized image for each labeled vector image 818, where the labeled vector image 818 is representative of a labeled vector image 808 or a vector image of the augmented vector image data 812. The rasterized image 820 and the labeled vector image 818 are associated as a training sample 816. In some implementations, as part of generating the training data (block 904), the crop module 822 generates a cropped training sample 824 for one or more of the training samples 816 by generating a cropped labeled vector image 826 from the labeled vector image 818 and generating a cropped rasterized image 828 from the rasterized image 820. Generation of the cropped training sample 824 is optionally performed and omitted in some implementations (e.g., in implementations where the stylized geometry element of the vector image data 804 from which the training sample 816 was generated is centered in aperture of the labeled vector image 818 and rasterized image 820.

A mask is generated from each raster image, where the mask denotes a region of the corresponding vector image at which the digital tool was applied (block 912). The mask module 830, for instance, generates a training sample mask 832 from each of the rasterized images 820 and cropped rasterized images 828 generated by the training system 820. A segmentation network is then trained to predict whether the digital tool was applied to each pixel of the mask using the corresponding labeled vector image as ground truth data (block 914). The network generation module 840, for instance, trains the segmentation network 842 using the training sample masks 832 and the training sample 816 or the cropped training sample 824 from which each of the training sample masks 832 were generated. Training continues until the segmentation network 842 is configured to output, for each of a plurality of different digital tools upon which the segmentation network 842 is trained, a mask that accurately indicates whether the corresponding digital tool was applied to each pixel of an input raster image. The trained segmentation network is then output as the trained tool region detection network (block 916). The network generation module 840, for instance, outputs tool region detection network 204 for use by the visual lens system 104.

Figure 10:
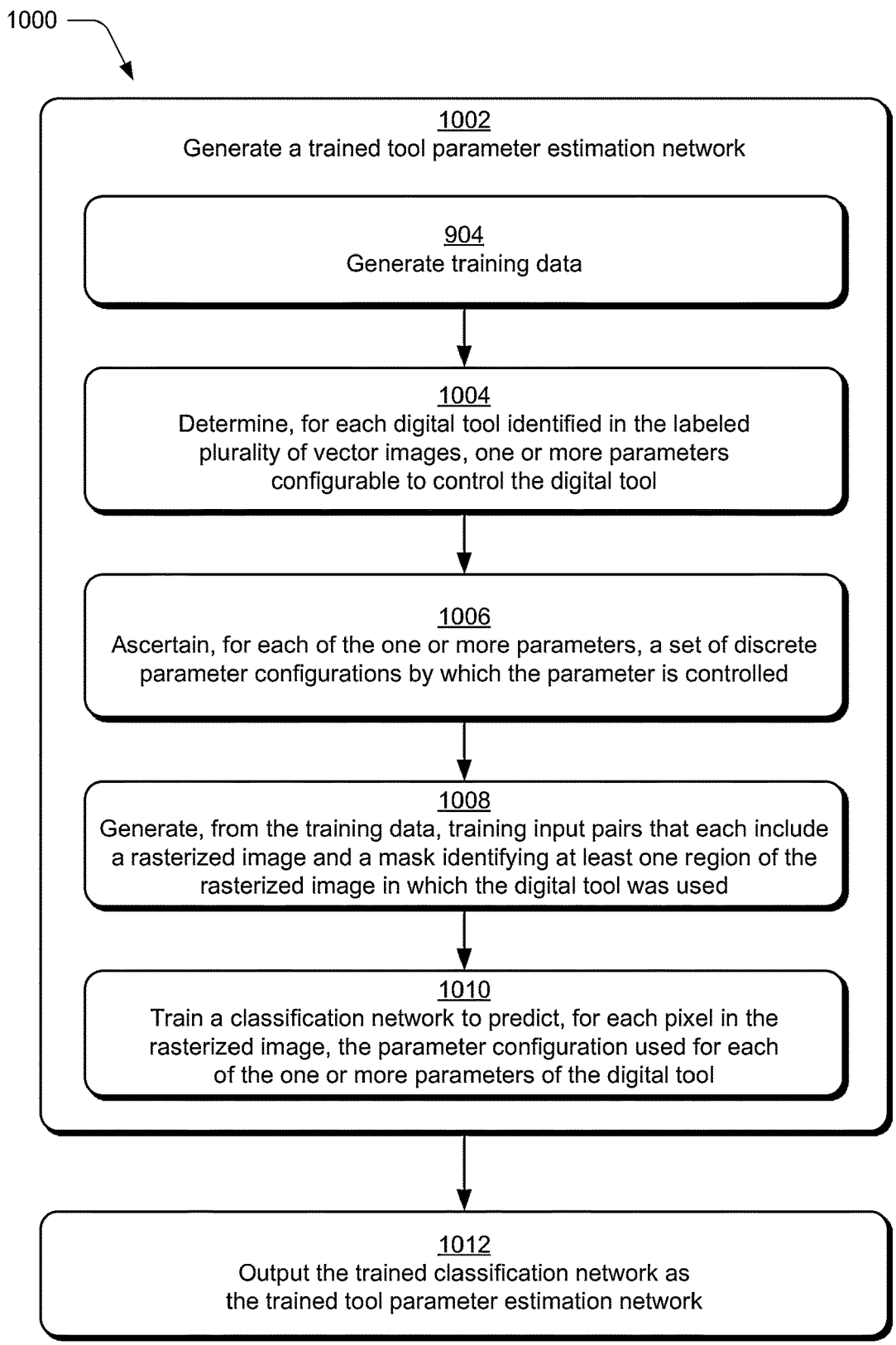
FIG. 10 is a flow diagram depicting a procedure in an example implementation of training a tool parameter estimation network used by the visual lens system of FIG. 1 to generate an interactive image from rasterized image data.

FIG. 10 depicts a procedure 1000 in an example implementation of generating a trained tool parameter estimation network (block 1002) that is useable by the visual lens system 104 to generate the interactive image 120 from image data 106 in accordance with the techniques described herein. As part of training the tool parameter estimation network, training data is generated (block 904) as described with respect to FIG. 9.

For each digital tool identified in the labeled plurality of vector images in the training data, one or more parameters that are configurable to control the digital tool are determined (block 1004). The parameter module 834, for instance, determines at least one parameter 836 associated with the digital tool identified by the labeled vector image

808 for each labeled vector image 808 included in the training data. For each of the one or more parameters, a set of discrete parameter configurations by which the parameter is controlled is ascertained (block 1006). The parameter module 834, for instance, ascertains a plurality of possible parameter configurations 838 for each parameter 836 associated with the digital tool identified by the labeling module 806.

From the training data, training input pairs are generated, where each training input pair includes a rasterized image and a mask identifying at least one region of the rasterized image in which the digital tool was used (block 1008). The network generation module 840, for instance, generates a training pair that includes a training sample mask 832 and the corresponding rasterized image 820 of the training sample 816 from which the training sample mask 832 was generated. A classification network is then trained to predict, for each pixel in the rasterized image, the parameter configuration used for each of the one or more parameters of the digital tool used to generate the rasterized image (block 1010).

The network generation module 840, for instance, concatenates as input the training pair and causes the classification network 844 to generate a probability distribution of the possible parameter configurations 838 for each digital tool parameter 836 as being used to achieve a visual appearance of each pixel of the rasterized image 820 in the training pair. Training continues until the classification network 844 is configured to accurately predict as the most likely confidence value the correct parameter configuration 838 for each parameter 836 of a digital tool used to generate the vector image data 804 from which the training sample 816 was generated. The trained classification network is then output as the trained tool parameter estimation network (block 1012). The network generation module 840, for instance, outputs the tool parameter estimation network 218 for use by the visual lens system 104 in generating an interactive image 120 given raster image data 106 as input.

Figure 11:
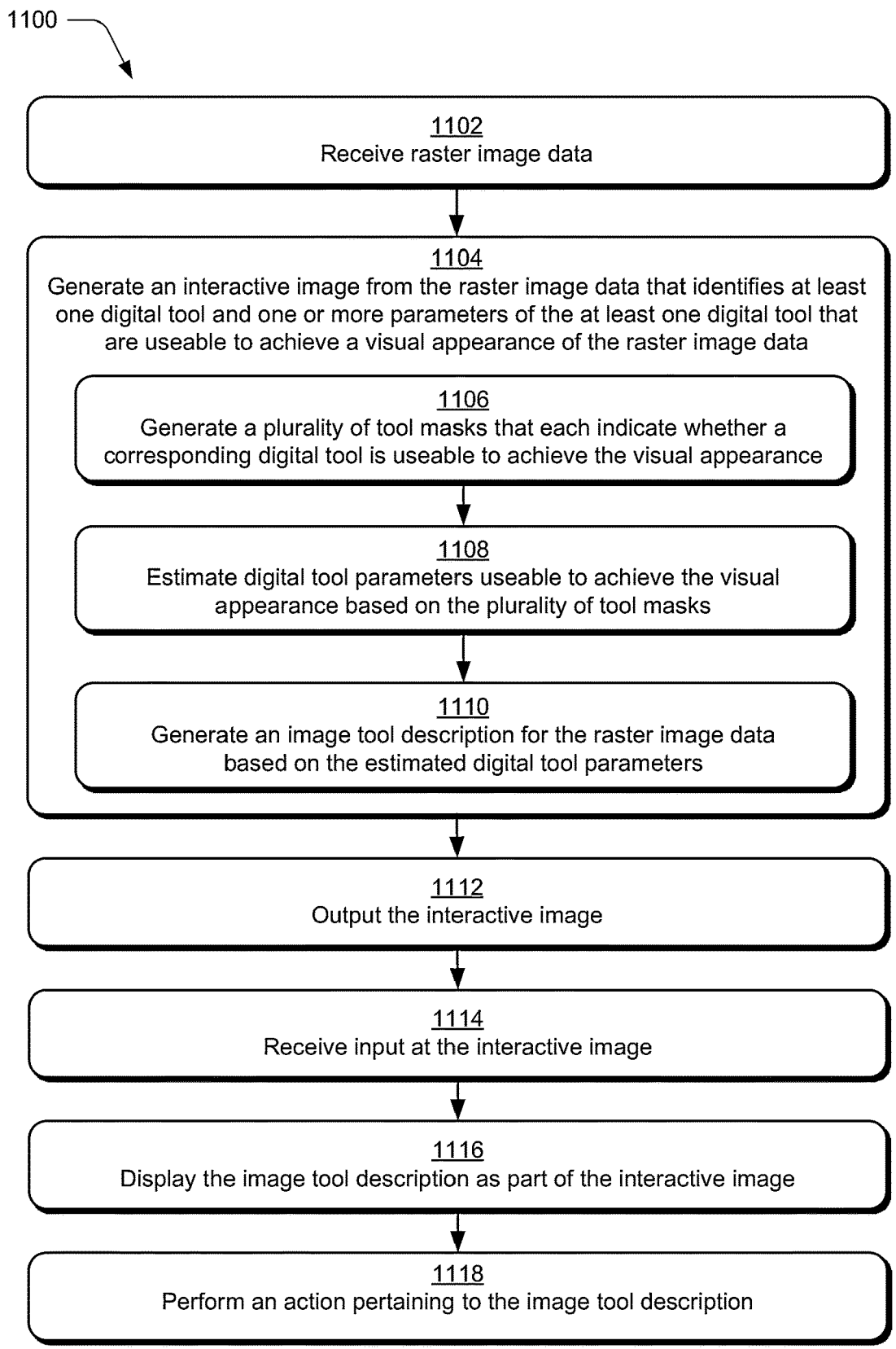
FIG. 11 is a flow diagram depicting a procedure in an example implementation in which an interactive image is generated from rasterized image data and output to display information describing digital tool parameters useable to achieve a visual appearance of the rasterized image data.

FIG. 11 depicts a procedure 1100 in an example implementation of generating an interactive image from raster image data in accordance with the techniques described herein. Raster image data is received (block 1102). The visual lens system 104, for instance, receives image data 106 that is representative of a raster image. An interactive image is then generated from the raster image data that identifies at least one digital tool and one or more parameters of the digital tool that are useable to achieve a visual appearance of the raster image data (block 1104). As part of generating the interactive image, a plurality of tool masks are generated, where each tool mask indicates whether a corresponding digital tool is useable to achieve the visual appearance of the raster image data (block 1106). The tool detection module 202, for instance, processes the image data 106 using the tool region detection network 204 to generate a plurality of tool masks 208 for at least one image region 206 of the image data 106.

Digital tool parameters useable to achieve the visual appearance of the raster image data are then estimated based on the plurality of tool masks (block 1108). The padding module 210, for instance, generates a padded tool mask 214 from each of the tool masks 208 indicating that a corresponding digital tool is useable to achieve a visual appearance of the image region 206 corresponding to the tool mask 208. The padding module 210 additionally generates a padded image region 212 for each padded tool mask 214 from a corresponding image region 206 of the image data 106. The padded image region 212 and corresponding padded tool mask 214 are concatenated by the parameter estimation module 216 and provided as input to the tool parameter estimation network 218, which causes the tool parameter estimation network 218 to generate parameters 112. As described herein, by virtue of training upon the one or more parameters 836 and discrete set of parameter configurations 838 for each of a plurality of digital tools, the parameters 112 represent a most likely parameter configuration 838 useable by each digital tool parameter 836 to achieve the visual appearance of each image region 206 pixel in the image data 106.

An image tool description for the raster image data is then generated based on the estimated digital tool parameters (block 1110). The tool description module 220, for instance, generates image tool description 110, which specifies a digital tool and its associated parameters 112 that are useable to achieve a visual appearance of one or more image regions 206 of the image data 106. The interactive image is output (block 1112). The rendering module 222, for instance, outputs the image data 106 with the incorporated image tool description 110 as the interactive image 120.

Input is received at the interactive image (1114). For instance, input selecting the selectable user interface component 122 of the interactive image 120 as displayed in the user interface 116 of the visual lens system 104 is received by computing device 102. Responsive to receiving input at the interactive image, the image tool description is displayed as part of the interactive image (block 1116). The visual lens system 104, for instance, causes display of the image tool description 110 illustrated in FIG. 1 responsive to receiving input selecting the selectable user interface component 122. As another example, the visual lens system 104 causes display of the image tool description 110 illustrated in FIG. 6 responsive to receiving input at the image region 206 of the interactive image 120 as indicated by the cursor 602.

In accordance with one or more implementations, an action pertaining to the image tool description is performed (block 1118). The visual lens system 104, for instance, causes display of information for a digital tool associated with the image tool description 110 (e.g., responsive to receiving input at the control 604 of the image tool description 110 illustrated in FIG. 6). Alternatively or additionally, the visual lens system 104 copies parameters 112 of the image tool description 110 (e.g., responsive to receiving input at the control 606 of the image tool description 110 illustrated in FIG. 6). Alternatively or additionally, the visual lens system 104 applies parameters 112 of the image tool description 110 to different image data (e.g., responsive to receiving input at the image tool description 110 of FIG. 7 that applies the associated parameters 112 to image data 704, as indicated by path 702, resulting in the visual lens system 104 generating image data 706).

Having described example procedures in accordance with one or more implementations, consider now an example system and device to implement the various techniques described herein.

Example System and Device

Figure 12:
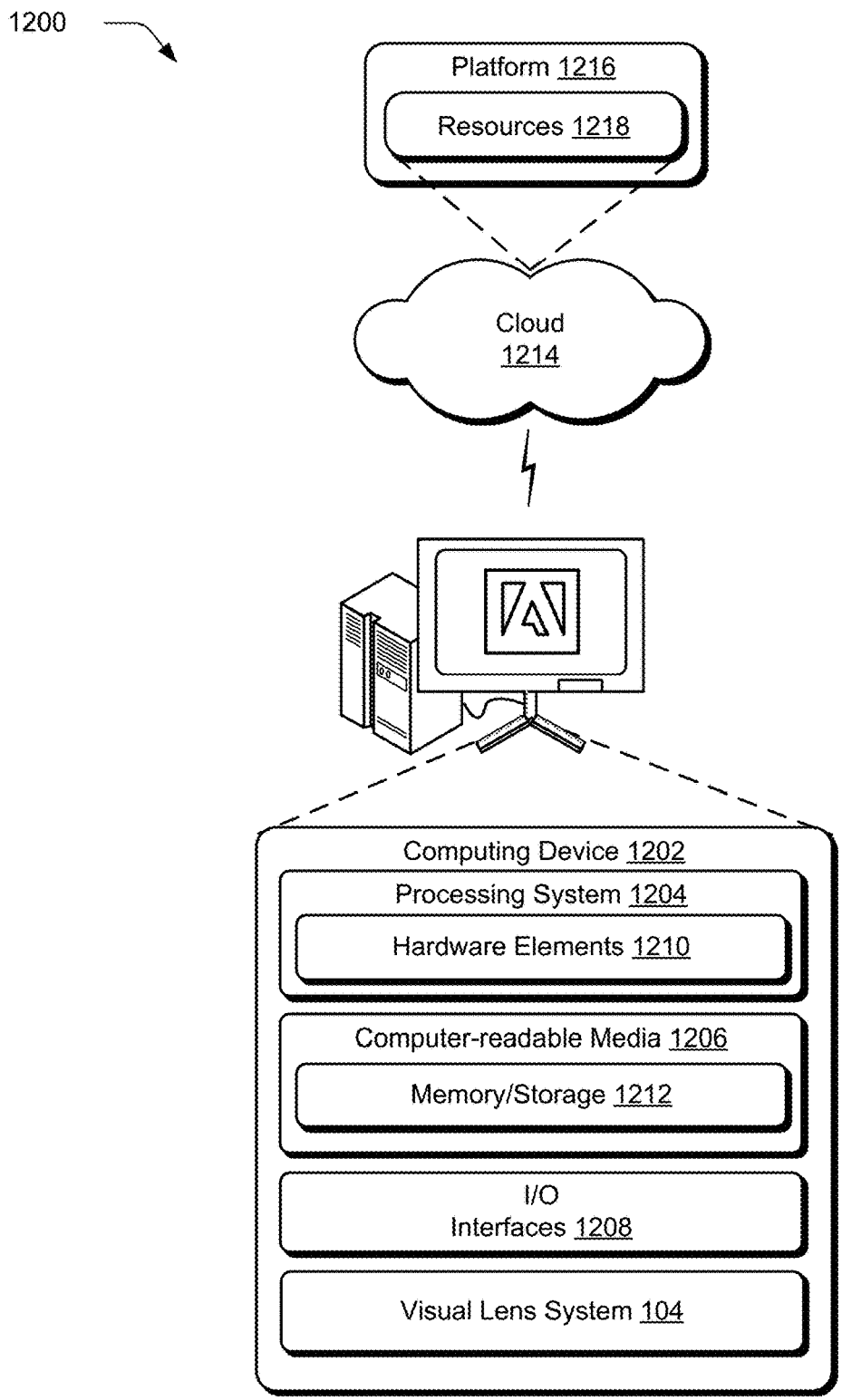
FIG. 12 illustrates an example system including various components of an example device to implement the techniques described with reference to FIGS. 1-11.

FIG. 12 illustrates an example system generally at 1200 that includes an example computing device 1202 that is representative of one or more computing systems and/or devices that implement the various techniques described herein. This is illustrated through inclusion of the visual lens system 104. The computing device 1202 is configured, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that are configurable as processors, functional blocks, and so forth. For instance, hardware element 1210 is implemented in hardware as an application specific integrated circuit or other logic device formed using one or more semiconductors. The hardware elements 1210 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1206 is illustrated as including memory/storage 1212. The memory/storage 1212 represents memory/storage capacity associated with one or more computer-readable media. The memory/storage 1212 is representative of volatile media (such as random access memory (RAM)) and/or nonvolatile media (such as read only memory (ROM), Flash memory, optical disks, magnetic disks, and so forth). The memory/storage 1212 is configured to include fixed media (e.g., RAM, ROM, a fixed hard drive, and so on) as well as removable media (e.g., Flash memory, a removable hard drive, an optical disc, and so forth). In certain implementations, the computer-readable media 1206 is configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1202, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is further configured to be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that is utilized while computer processing is executed on servers that are remote from the computing device 1202. Resources 1218 also include services provided over the Internet and/or through a subscriber network, such as a cellular or Wi-Fi network.

The platform 1216 is configured to abstract resources and functions to connect the computing device 1202 with other computing devices. The platform 1216 is further configured to abstract scaling of resources to provide a corresponding level of scale to encountered demand for the resources 1218 that are implemented via the platform 1216. Accordingly, in an interconnected device embodiment, implementation of functionality described herein is configured for distribution throughout the system 1200. For example, in some configurations the functionality is implemented in part on the computing device 1202 as well as via the platform 1216 that abstracts the functionality of the cloud 1214.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. In a digital medium automated digital tool identification environment, a method implemented by a computing device, the method comprising:
   receiving, by a visual lens system, image data for a rasterized image;
   generating, by the visual lens system, automatically and without user intervention, an interactive image that indicates a region of the rasterized image having a visual appearance that is achievable using a digital tool, the generating including:
      identifying, by a tool detection module, the digital tool by processing the rasterized image using a segmentation network trained to output a binary mask that indicates a probability of each pixel of the rasterized image being generated using the digital tool;
      ascertaining, by a parameter estimation module, a parameter configuration for controlling the digital tool to achieve the visual appearance;
      creating, by a tool description module, an image tool description based on the digital tool and the parameter configuration; and
      incorporating the image tool description into the image data; and
   outputting, by the visual lens system, the interactive image at a display of a computing device and outputting a display of the image tool description responsive to detecting input at the region.

2. The method of claim 1, wherein the segmentation network is further trained to output, for each of a plurality of different digital tools, a binary mask indicating a probability that each pixel of the rasterized image was generated using a corresponding one of the plurality of different digital tools.

3. The method of claim 2, wherein identifying the digital tool comprises concatenating the binary mask corresponding to the digital tool and the region of the rasterized image and generating a probability distribution of possible parameter configurations for the digital tool by inputting a result of the concatenating to a classification network, the probability distribution indicating whether each of the possible parameter configurations is useable to achieve the visual appearance.

4. The method of claim 3, wherein concatenating the binary mask corresponding to the digital tool and the region of the rasterized image comprises generating a padded instance of the binary mask at an input data size for the classification network, wherein a portion of the binary mask corresponding to the region of the rasterized image is centered in an aperture of the padded instance of the binary mask.

5. The method of claim 1, wherein outputting the interactive image comprises displaying an indication that visually distinguishes the region of the rasterized image from at least one other region of the rasterized image.

6. The method of claim 1, wherein the digital tool includes a plurality of different parameters that are each configurable to control the digital tool and ascertaining the parameter configuration for controlling the digital tool comprises ascertaining a parameter configuration for each of the plurality of different parameters.

7. The method of claim 1, wherein the image tool description includes a control that is selectable to display of information describing the digital tool, the method further comprising causing display of the information describing the digital tool responsive to detecting input at the control.

8. The method of claim 1, wherein the image tool description includes a control that is selectable to copy the parameter configuration for controlling the digital tool, the method further comprising storing the parameter configuration in memory of the computing device responsive to detecting input at the control.

9. The method of claim 1, wherein the image tool description comprises at least one of a textual description identifying a name of the digital tool and describing the parameter configuration or a visual depiction of the visual appearance achievable using the parameter configuration for the digital tool.

10. The method of claim 1, wherein the interactive image comprises a plurality of different image regions having visual appearances that are each achievable using a digital tool, wherein generating the interactive image comprises generating an image tool description for each of the plurality of different image regions.

11. The method of claim 1, further comprising outputting, at the display of the computing device, vector image data and modifying the vector image data using the digital tool and the parameter configuration of the digital tool.

12. In a digital medium automated digital tool identification environment, a system comprising:
  means for receiving image data for a rasterized image;
  means for generating, automatically and without user intervention, an interactive image that indicates a region of the rasterized image having a visual appearance that is achievable using a digital tool, the means for generating including:
  means for identifying the digital tool;
  means for ascertaining a parameter configuration for controlling the digital tool to achieve the visual appearance; and
  means for creating an image tool description based on the digital tool and the parameter configuration; and
  means for displaying the interactive image at a computing device.

13. In a digital medium automated digital tool identification environment, a system comprising:
  at least one processor; and
  a computer-readable storage medium storing instructions that are executable by the at least one processor to perform operations comprising:
  receiving image data for a rasterized image;
  generating, automatically and without user intervention, an interactive image that indicates a region of the rasterized image having a visual appearance that is achievable using a digital tool, the generating including:
  identifying the digital tool by processing the rasterized image using a segmentation network trained to output a binary mask that indicates a probability of each pixel of the rasterized image being generated using the digital tool;
  ascertaining a parameter configuration for controlling the digital tool to achieve the visual appearance;
  creating an image tool description based on the digital tool and the parameter configuration; and
  incorporating the image tool description into the image data; and
  outputting the interactive image at a display device and outputting a display of the image tool description responsive to detecting input at the region.

14. The system of claim 13, wherein the segmentation network is further trained to output, for each of a plurality of different digital tools, a binary mask indicating a probability that each pixel of the rasterized image was generated using a corresponding one of the plurality of different digital tools.

15. The system of claim 14, wherein identifying the digital tool comprises concatenating the binary mask corresponding to the digital tool and the region of the rasterized image and generating a probability distribution of possible parameter configurations for the digital tool by inputting a result of the concatenating to a classification network, the probability distribution indicating whether each of the possible parameter configurations is useable to achieve the visual appearance.

16. The system of claim 15, wherein concatenating the binary mask corresponding to the digital tool and the region of the rasterized image comprises generating a padded instance of the binary mask at an input data size for the classification network, wherein a portion of the binary mask corresponding to the region of the rasterized image is centered in an aperture of the padded instance of the binary mask.

17. The system of claim 13, wherein outputting the interactive image comprises displaying an indication that visually distinguishes the region of the rasterized image from at least one other region of the rasterized image.

18. The system of claim 13, wherein the digital tool includes a plurality of different parameters that are each configurable to control the digital tool and ascertaining the parameter configuration for controlling the digital tool comprises ascertaining a parameter configuration for each of the plurality of different parameters.

19. The system of claim 13, wherein the interactive image comprises a plurality of different image regions having visual appearances that are each achievable using a digital tool, wherein generating the interactive image comprises generating an image tool description for each of the plurality of different image regions.

20. The system of claim 13, further comprising outputting, at the display device, vector image data and modifying the vector image data using the digital tool and the parameter configuration of the digital tool.

* * * * *